US007795355B2

(12) United States Patent
Matyjaszewski et al.

(10) Patent No.: US 7,795,355 B2
(45) Date of Patent: Sep. 14, 2010

(54) PREPARATION OF FUNCTIONAL POLYMERS

(75) Inventors: Krzyszlof Matyjaszewski, Pittsburgh, PA (US); Brent S. Sumerlin, Pittsburgh, PA (US); Nicolay V. Tsarevsky, Pittsburgh, PA (US); James Spanswick, Wheaton, IL (US)

(73) Assignee: Carnegie Mellon University, Pittsburgh, PA (US)

( * ) Notice: Subject to any disclaimer, the term of this patent is extended or adjusted under 35 U.S.C. 154(b) by 716 days.

(21) Appl. No.: 10/591,425

(22) PCT Filed: Mar. 7, 2005

(86) PCT No.: PCT/US2005/007264

§ 371 (c)(1),
(2), (4) Date: Jun. 22, 2007

(87) PCT Pub. No.: WO2005/087818

PCT Pub. Date: Sep. 22, 2005

(65) Prior Publication Data

US 2007/0244265 A1    Oct. 18, 2007

Related U.S. Application Data

(60) Provisional application No. 60/611,853, filed on Sep. 21, 2004, provisional application No. 60/550,413, filed on Mar. 5, 2004.

(51) Int. Cl.
*C08F 8/30* (2006.01)

(52) U.S. Cl. ............... 525/328.2; 525/328.3; 525/329.1; 525/329.2; 525/329.3; 525/376

(58) Field of Classification Search ............. 525/328.2, 525/328.3, 329.1, 329.2, 329.3, 376
See application file for complete search history.

(56) References Cited

U.S. PATENT DOCUMENTS

| | | | |
|---|---|---|---|
| 3,096,312 A * | 7/1963 | Henry ...................... | 525/326.7 |
| 3,183,217 A | 5/1965 | Serniuk et al. | |
| 3,350,374 A * | 10/1967 | Fetscher et al. .......... | 525/329.1 |
| 3,397,186 A | 8/1968 | Edward at al. | |
| 3,472,826 A * | 10/1969 | Potts et al. .................... | 528/69 |
| 3,716,550 A * | 2/1973 | Gilligan et al. ............... | 548/250 |
| 3,753,956 A * | 8/1973 | Tuites et al ............... | 525/327.5 |
| 3,862,978 A | 1/1975 | Decker et al. | |
| 3,959,225 A | 5/1976 | Kuntz | |
| 4,007,165 A | 2/1977 | MacLeay et al. | |
| 4,145,586 A | 3/1979 | Swann | |
| 4,374,751 A | 2/1983 | Dudgeon | |
| 4,728,706 A | 3/1988 | Farnham et al. | |
| 4,940,648 A | 7/1990 | Geiger | |
| 4,954,416 A | 9/1990 | Wright et al. | |
| 5,089,135 A | 2/1992 | Yoneyama et al. | |
| 5,169,914 A | 12/1992 | Kaszas et al. | |
| 5,312,871 A | 5/1994 | Mardare et al. | |
| 5,405,913 A | 4/1995 | Harwood et al. | |
| 5,451,647 A | 9/1995 | Faust et al. | |
| 5,470,928 A | 11/1995 | Harwood et al. | |
| 5,510,307 A | 4/1996 | Narayanan et al. | |
| 5,708,102 A | 1/1998 | Fryd et al. | |
| 5,763,548 A | 6/1998 | Matyjaszewski et al. | |
| 5,767,210 A | 6/1998 | Lecomte et al. | |
| 5,773,538 A | 6/1998 | Feiring | |
| 5,789,487 A | 8/1998 | Matyjaszewski et al. | |
| 5,807,937 A | 9/1998 | Matyjaszewski et al. | |
| 5,811,500 A | 9/1998 | Dubois et al. | |
| 5,854,364 A | 12/1998 | Senninger et al. | |
| 5,886,118 A | 3/1999 | Percec | |
| 5,910,549 A | 6/1999 | Matyjaszewski et al. | |
| 5,945,491 A | 8/1999 | Matyjaszewski et al. | |
| 6,111,022 A | 8/2000 | Matyjaszewski et al. | |
| 6,114,482 A | 9/2000 | Senninger et al. | |
| 6,121,371 A | 9/2000 | Matyjaszewski et al. | |
| 6,124,411 A | 9/2000 | Matyjaszewski et al. | |

(Continued)

FOREIGN PATENT DOCUMENTS

CA    2209061    2/1998

(Continued)

OTHER PUBLICATIONS

U.S. Appl. No. 09/534,827, filed Mar. 23, 2000, Matyjaszewski at al.

(Continued)

*Primary Examiner*—Bernard Lipman
(74) *Attorney, Agent, or Firm*—K&L Gates LLP

(57) ABSTRACT

The process of the present invention is directed toward conducting highly selective, high yield post polymerization reactions on polymers to prepare functionalized polymers. An embodiment of the present invention comprises conducting click chemistry reactions on polymers. Preferably, the polymers were prepared by controlled polymerization processes. Therefore, embodiments of the present invention comprise processes for the preparation of polymers comprising conducting a click chemistry reaction on a functional group attached to a polymer, wherein the polymer has a molecular weight distribution of less than 2.0. The functional polymers may be prepared by converting an attached functional unit on the polymer thereby providing site specific functional materials, site specific functional materials comprising additional functionality, or chain extended functional materials. Embodiments of the process of the present invention include functionalization reactions, chain extensions reactions, to form mock copolymer linking reactions, and attaching side chains to form graft copolymers, for example.

20 Claims, 4 Drawing Sheets

U.S. PATENT DOCUMENTS

| | | | |
|---|---|---|---|
| 6,143,848 | A | 11/2000 | Lee et al. |
| 6,162,882 | A | 12/2000 | Matyjaszewski et al. |
| 6,235,822 | B1* | 5/2001 | Whetten et al. ............ 524/191 |
| 6,255,448 | B1 | 7/2001 | Grimaldi et al. |
| 6,288,186 | B1 | 9/2001 | Matyjaszewski et al. |
| 6,310,149 | B1 | 10/2001 | Haddleton |
| 6,407,187 | B1 | 6/2002 | Matyjaszewski et al. |
| 6,512,060 | B1 | 1/2003 | Matyjaszewski et al. |
| 6,538,091 | B1 | 3/2003 | Matyjaszewski et al. |
| 6,541,580 | B1 | 4/2003 | Matyjaszewski et al. |
| 6,624,262 | B2 | 9/2003 | Matyjaszewski et al. |
| 6,624,263 | B2 | 9/2003 | Matyjaszewski et al. |
| 6,627,314 | B2 | 9/2003 | Matyjaszewski et al. |
| 6,672,717 | B2 | 1/2004 | Smith |
| 6,692,914 | B1 | 2/2004 | Klaerner et al. |
| 6,759,491 | B2 | 7/2004 | Matyjaszewski et al. |
| 6,790,919 | B2 | 9/2004 | Matyjaszewski et al. |
| 6,887,962 | B2 | 5/2005 | Matyjaszewski et al. |
| 7,019,082 | B2 | 3/2006 | Matyjaszewski et al. |
| 7,049,373 | B2 | 5/2006 | Matyjaszewski et al. |
| 7,056,455 | B2 | 6/2006 | Matyjaszewski et al. |
| 7,064,166 | B2 | 6/2006 | Matyjaszewski et al. |
| 7,125,938 | B2 | 10/2006 | Matyjaszewski et al. |
| 7,157,530 | B2 | 1/2007 | Matyjaszewski et al. |
| 7,332,550 | B2 | 2/2008 | Matyjaszewski et al. |
| 7,572,874 | B2 | 8/2009 | Matyjaszewski et al. |
| 2006/0258826 | A1 | 11/2006 | Matyjaszewski et al. |
| 2007/0106012 | A1 | 5/2007 | Matyjaszewski et al. |
| 2007/0155926 | A1 | 7/2007 | Matyjaszewski et al. |
| 2007/0244265 | A1 | 10/2007 | Matyjaszewski et al. |
| 2007/0276101 | A1 | 11/2007 | Matyjaszewski et al. |
| 2009/0171024 | A1 | 7/2009 | Jakubowski et al. |
| 2009/0176951 | A1 | 7/2009 | Matyjaszewski et al. |
| 2009/0312505 | A1 | 12/2009 | Matyjaszewski et al. |

FOREIGN PATENT DOCUMENTS

| | | |
|---|---|---|
| CN | 1165828 A | 11/1997 |
| EP | 0265091 A1 | 4/1988 |
| EP | 0341012 A2 | 11/1989 |
| EP | 0789036 A1 | 8/1997 |
| EP | 0816385 A1 | 1/1998 |
| EP | 0870809 A2 | 10/1998 |
| WO | WO 98/06758 A1 | 2/1998 |
| WO | WO 98/20050 A2 | 5/1998 |
| WO | WO 00/47634 A1 | 8/2000 |
| WO | WO 00/56795 A1 | 9/2000 |
| WO | WO 2007/025086 A2 | 3/2007 |
| WO | WO 2007/059350 A2 | 5/2007 |
| WO | WO 2008/057163 A2 | 5/2008 |
| WO | WO 2008/148000 A1 | 12/2008 |
| WO | WO 2009/023353 A9 | 2/2009 |
| WO | WO 2009/111725 A1 | 9/2009 |

OTHER PUBLICATIONS

PCT International Search Report for International Application No. PCT/US05107264 filed Jun. 12, 2005, mailed Jul. 5, 2005.

K. Carter at al., Polyimide Nanofoams From Phase-Separated Block Copolymers, Electrochemical Society Proceedings, 1997, pp. 32-43, vol. 97(8), Electrochemical Society, Pennington, NJ, US.

Chen at al., Pryolytic Behavior and In-Situ Paramagnetism of Starlike C60(CH3)×(PAN)xcopolymers, European Polymer Journal, 1998, pp. 421-429, vol. 34(3-4), Elsevier Science Ltd., Oxford, GB.

D. Greszta at al., Gradient Copolymers of Styrene and Acrylonitrille Via Atom Transfer Radical Polymerization, Polymer Preprints, 1997, pp. 709-710, vol. 38(1).

J. Gromada et al., Simultaneous Reverse and Normal Initiation in Atom Transfer Radical Polymerization, Macromolecules, 2001, pp. 7664-7671, 34(22).

J. S. Wang at al., Controlled/"Living" Radical Polymerization. Atom Transfer Radical Polymerization in the Presence of Transition-Metal Complexes, Journal of the American Chemical Society, 1995, pp. 5614-5615, vol. 117(20).

J.-S. Wang et al., Controlled/"Living" Radical Polymerization. Halogen Atom Transfer Radical Polymerization Promoted by a Cu(I)/Cu(II) Redox Process, Macromolecules, 1995, pp. 7901-7910, vol. 28(23).

K. Matyjaszewski at al., Controlled/"Living" Radical Polymerization of Styrene and Methly Methacrylate Catalyzed by Iron Complexes1, Macromolecules, 1997, pp. 8161-8164, vol. 30(26).

K. Matyjaszewski et al., Zerovalent Metals in Controlled/"Living" Radical Polymerization, Macromolecules, 1997, pp. 7348-7350, vol. 30(23).

K. Matyjaszewski ed., Controlled/"Living" Radical Polymerization. Progress in ATRP, NMP, and RAFT, in: ACS Symposium Ser., 2000, Chapter 19, Reverse Atom Transfer Radical Polymerization Using AIBN or BPO as Initiator, pp. 263-275.

M. Wei et al., Atom Transfer Radical Polymerization of Styrene in the Presence of Iron Complexes, Polymer Preprints, 1997, pp. 231, vol. 38(2).

J. Qiu et al., Cyclic Voltammetric Studies of Copper Complexes Catalyzing Atom Transfer Radical Polymerization, Macromolecular Chemistry and Physics, 2000, pp. 1625-1631, vol. 201(14).

J. Queffelec et al., Optimization of Atom Transfer Radical Polymerization Using Cu(I)/Tris(2-(dimethylamino)ethyl)amine as a Catalyst, Macromolecules, 2000, pp. 8629-8639, vol. 33.

S. Coca et al., Polymerization of Acrylates by Atom Transfer Radical Polymerization. Homopolymerization of 2-Hydroxyethyl Acrylate, Journal of Polymer Science, Part A: Polymer Chemistry, 1998, pp. 1417-1424, vol. 36.

S. M. Jo et al., Polyacrylonitrile with Low Polydispersities by Atom Transfer Radical Polymerization, Polymer Preprints, 1997, pp. 697-698, vol. 38(1).

S. M. Jo at al., Effects of Various Copper Salts and Additives on Polymerization of Acrylonitrile by Atom Transfer Radical Polymerization, Polymer Preprints, 1997, pp. 699-700, vol. 38(1).

T. Takeichi et al., Preparation of Porous Carbon Films by the Pyrolysis of Poty(Urethane-imide) Films and Their Pore Characteristics, Carbon, 2001, pp. 257-265, vol. 39(2).

T. E. Patten at al., Atom Transfer Radical Polymerization and the Synthesis of Polymeric Materials, Advanced Materials, 1998, pp. 901-915, vol. 10(12).

T.E. Patten et al., Polymers with very Low Polydispersities from Atom Transfer Radical Polymerization, 1996, Science, pp. 866-868, vol. 272.

U. Schubert et al., Design of Effective Systems for Controlled Radical Polymerization of Styrene: Application of 4,4'-Dimethyl and 5,5'-Dimethyl 2,2'-Bipyridine Copper(II) Complexes, Macromolecular Rapid Communication, 1999, pp. 351-355, vol. 20.

J. S. Wang at al., "Living"/Controlled Radical Polymerization, Transition-Metal-Catalyzed Atom Transfer Radical Polymerization in the Presence of a Conventional Radical Initiator, Macromolecules, 1995, pp. 7572-7573, vol. 28.

Z. Demko et al., A Click Chemistry Approach to Tetrazoles by Huisgen 1,3-Dipolar Cycloaddition: Synthesis of 5-Acyltetrazoles from Azides and Acyl Cyanides, , Angewandte Chemie, International Edition, 2004, pp. 2113-2116, vol. 41(12).

J. Xia et al., Controlled/"Living" Radical Polymerization. Homogenous Reverse Atom Transfer Radical Polymerization Using AIBN as the Initiator, Macromolecules, 1997, pp. 7692-7696, vol, 30.

T. Otsu, at al., Synthesis, Reactivity, and Role of -Vinylbenzyl N,N-Diethyldithiocarbamate as a Monomer-Iniferter in Radical Polymerization, Macromolecules, 1986, pp. 287-290, vol. 19(2).

T. Otsu, et al., New Initiator Systems for Radical Polymerization of Vinyl Monomers, Polymer Letters, 1967, pp. 697-701, vol, 5.

V. Percec at al., Self-Regulated Phase Transfer of $Cu_2O$/bpy, Cu(0)/bpy, and $Cu_2$ O(Cu(0)bpy Catalyzed "Living" Radical Polymerization Initiated with Sulfonyl Chlorides, Macromolecules, 1998, pp. 4053-4056, vol. 31(12).

A. Orochov at al., Redox-Transfer, Part VI, Determination of Hammet's P-Constant for the Oxidation of Cuprous Chloride by Aromatic Sulphonyl Chlorides, Journal of the Chemical Society (B), date unknown, pp. 255-259.

M. Asscher at al., Chlorine-Activation by Redox-Transfer, Part IV, The Addition of Sulphonyl Chlorides to Vinylic Monomers and Other Olefins, Journal of the Chemical Society, 1964, pp. 4962-4971.

N. Kamigata, at al., Novel Perfluoroalkylation of Alkenes with Perfluoroalkanesulphonyl Chlorides Catalysed by a Ruthenium (II) Complex, Journal of the Chemical Society, Perkins Transactions 1, 1991, pp. 627-633.

V. Percec at al., "Living" Radical Polymerization of Styrene Initiated by Arenesulfonyl Chlorides and $Cu^1(bpy)_nCl$, Macromolecules, 1995, pp. 7970-7972, vol. 28(23).

V. Percec et al., Metal-Catalyzed "Living" Radical Polymerization of Styrene Initiated with Arenesulfonyl Chlorides. From Heterogeneous to Homogeneous Catalyses, Macromolecules, 1996, pp. 3665-3668, vol. 29(10).

Chemical Abstracts, vol. 85, 1976, pp. 20.

O.W. Webster, Living Polymerization Methods, Science, 1991, pp. 887-893, vol. 25.

C. Granel et al., Controlled Radical Polymerization of Methacrylic Monomers in the Presence of Bis(ortho-chelated) Arylnickel (II) Complex and Different Activated Alkyl Halides, Macromolecules, 1996, pp. 8576-8582, vol. 29(27).

C. Marestin et al., Nitroxide Mediated Living Radical Polymerization of Styrene in Emulsion, Macromolecules, 1998, pp. 4041-4044, vol. 31(12).

S.A.F. Bon et al,, Controlled Radical Polymerization in Emulsion, Macromolecules, 1997, pp. 324-326, vol. 30(2).

T. Nishikawa at al., Evidence for Living Radical Polymerization of Methyl Methacrylate with Ruthenium Complex: Effects of Protic and Radical Compounds and Reinitiation from the Recovered Polymers, Macromolecules, 1997, pp. 2244-2248, vol. 30(8).

K. Matyjaszewski at al., Atom Transfer Radical Polymerization, Chemical Reviews, 2001, pp. 2921-2990, vol. 101(9).

K. Matyjaszewski ed., Controlled Radical Polymerization, American Chemical Society Division of Polymer Chemistry, 1998, ACS Symposium Series, Ch. 1, pp. 2-30. vol. 685.

N. V. Tsarevsky et al., Well-Defined (Co)polymers with 5-Vinyltetrazole Units via Combination of Atom Transfer Radical (Co)polymerization of Acrylonitrile and "Click Chemistry"-Type Postpolymerization Modification, Macromolecules, 2004, pp. 9308-9313, vol. 37(25).

J. P. Collman et al., "Clicking" Functionality onto Electrode Surfaces, Langmuir, 2004, pp. 1051-1053, vol. 20.

H. Kolb et al., Click Chemistry: Diverse Chemical Function from a Few Good Reactions, Angewandte Chemie, International Edition, 2001, pp. 2004-2021, vol. 40(11).

Z. Demko et al., A Click Chemistry Approach to Tetrazoles by Huisgen 1,3-Dipolar Cycloaddition: Synthesis of 5-Sulfonyl Tetrazoles from Azides and Sulfonyl Cyanides, Angewandte Chemie, International Edition, 2002, pp. 2110-2113 , vol. 41(12).

S. Punna et al., Click Chemistry in Polymer Synthesis, Polymer Preprints, 2004, pp. 778-779, vol. 45(1).

V. N. Kizhnyaev et al., Vinyltetrazoles: Synthesis and Properties, Russian Chemical Reviews, 2003, pp. 143-164, vol. 72(2).

B. Helms et al., Dendronized Linear Polymers via "Click Chemistry", Journal of the American Chemical Society, 2004, pp. 15020-15021, vol. 126(46).

J. Stille et al., Synthesis and Copolymerization of Styryl-Substituted Tetrazoles. Thermal Cross-Linking of Copolymers Containing Dipolarophiles and the Tetrazoles as Nitrile Imine Dipole Precursors, Macromolecules, 1972, pp. 377-384, vol. 5(4).

R. Darkow et al., Synthesis, Photomodification and Characterization of Homo- and Copolymers with 2,5-bisaryltetrazolyl Pendant Groups, Reactive and Functional Polymers, 1997, pp. 195-207, vol. 32(2).

V. Annenkov at al., Poly-C-vinyltetrazoles: A New Type of Polyacid, Journal of Polymer Science Part A: Polymer Chemistry, 1993, pp. 1903-1906, vol. 31(7).

C. J. Hawker at al,, The Convergent-Growth Approach to Dentritic Macromolecules, Advances in Dendritic Macromolecules, 1995, pp. 1-39, vol. 2.

O, A, Iviatthews at al., Dendrimers-Branching out from Curiosites into New Technologies, Progress in Polymer Science, 1998, pp. 1-56, vol. 23.

J.-P. Majoral et al., Dendrimers Containing Heteroatoms (Si, P, B, Ge, or Bi), Chemical Reviews, 1999, pp. 845-880, vol. 99(3).

S. Grayson et al., Convergent Dendrons and Dendrimers: From Synthesis to Applications, Chemical Reviews, 2001, pp. 3819-3867, vol. 101(12).

V. Maraval et al., "Lego" Chemistry for the Straightforward Synthesis of Dendrimer, Journal of Organic Chemistry, 2003, pp. 6043-6046, vol. 68(15).

H. Ihre at al., Fast and Convenient Divergent Synthesis of Aliphatic Ester Dendrimers by Anhydride Coupling, Journal of the American Chemical Society, 2001, pp. 5908-5917, vol. 123(25).

M. Carnahan et al., Synthesis and Characterization of Poly(glycerol-succinic acid) Dendrimers, Macromolecules, 2001, pp. 7648-7655, vol. 34(22).

P. Vvu at al., Efficiency and Fidelity in a Click-Chemistry Route to Triazole Dendrimers by the Copper(I)-Catalyzed Ligation of Azides and Alkynes, Angewandte Chemie, International Edition, 2004, pp. 3928-3932, vol. 43(30).

T. Makino et al., Controlled Atom Transfer Radical Polymerizations of Methyl Methacrylate Under Micellar Conditions, Polymer Preprints, 1988, pp. 288-289, vol. 39(1).

K. Matyjaszewski et al., Controlled/Living Radical Polymerization: State of the Art in 2002, in ACS Symposium Series, Advances in Controlled/living Radical Polymerizations, American Chemical Society Division of Polymer Chemistry, 2003, Chapter 1, pp. 2-9, vol. 854.

T. Pintauer et al., Toward Structural and Mechanistic Understanding of Transition Metal-Catalyzed Atom Transfer Radical Processes, in ACS Symposium Series, Advances in Controlled/living Radical Polymerizations, American Chemical Society Division of Polymer Chemistry, 2003, Chapter 10, pp. 130-147, vol. 854.

Wang at al., ESR Study and Radical Observation in Transition Metal-Mediated Polymerization: Unified View of Atom Transfer Radical Polymerization Mechanism, in ACS Symposium Series, Advances in Controlled/living Radical Polymerizations, American Chemical Society Division of Polymer Chemistry, 2003, Chapter 12, pp. 161-179, vol. 854.

J-F Lutz et al,. Synthesis and Properties of Copolymers with Tailored Sequence Distribution by Controlled/Living Radical Polymerization, In ACS Symposium Series, Advances in Controlled/living Radical Polymerizations, American Chemical Society Division of Polymer Chemistry, 2003, Chapter 19, pp. 268-282, vol. 854.

T. Pakula et al., Polymers, Particles, and Surfaces with Hairy Coatings: Synthesis, Structure, Dynamics, and Resulting Properties, in ACS Symposium Series, Advances in Controlled/living Radical Polymerizations, American Chemical Society Division of Polymer Chemistry, 2003, Chapter 26, pp. 366-382, vol. 854.

K. Matyjaszewski et al., Controlled/Living Radical Polymerization: State of the Art in 2005, in Controlled Radical Polymerization: From Synthesis to Materials, American Chemical Society Division of Polymer Chemistry, 2005, Chapter 1, pp. 2-12, vol. 944.

N. Tsarevesky et al., Factors Determining the Performance of Copper-Based Atom Transfer Radical Polymerization Catalysts and Criteria for Rational Catalyst Selection, in Controlled Radical Polymerization: From Synthesis to Materials, American Chemical Society Division of Polymer Chemistry, 2005, Chapter 5, pp. 56-70, vol. 944.

B. Sumerlin et al., Click Functionalization of Well-Defined Copolymers Prepared by Atom Transfer Radical Polymerization, in Controlled Radical Polymerization: From Synthesis to Materials, American Chemical Society Division of Polymer Chemistry, 2005, Chapter 11, pp. 140-152, vol. 944.

R. Richard et al., Acrylate-Based Block Copolymers Prepared by Atom Transfer Radical Polymerization as Matrices for Drug Delivery Applications, in Controlled Radical Polymerization: From Synthesis to Materials, American Chemical Society Division of Polymer Chemistry, 2005, Chapter 17, pp. 234-251, vol. 944.

P. Mccarthy et al., Grafting Chromatographic Stationary Phase Substrates by Atom Transfer Radical Polymerization, in Controlled Radical Polymerization: From Synthesis to Materials, American Chemical Society Division of Polymer Chemistry, 2005, Chapter 18, pp. 252-268, vol. 944.

T. Kowalewski et al., Advances in Nanostructured Carbons from Block Copolymers Prepared by Controlled Radical Polymerization Techniques, in Controlled Radical Polymerization: From Synthesis to Materials, American Chemical Society Division of Polymer Chemistry, 2005, Chapter 21, pp. 295-310, vol. 944.

* cited by examiner

PREPARATION OF FUNCTIONAL POLYMERS

CROSS REFERENCE TO RELATED APPLICATIONS

This application is a U.S. national stage filing under 35 U.S.C. §371 of International Application No. PCT/US05/07264 filed Mar. 7, 2005 and claims benefit of and priority to U.S. Provisional Ser. No. 60/550,413 filed Mar. 5, 2004 and U.S. Provisional Ser. No. 60/661,853 filed Sep. 21, 2004.

TECHNICAL FIELD OF THE INVENTION

This invention is directed to a process for preparation and use of oligomers and polymers with attached functionality and is also directed to oligomers and polymers produced by the process. Embodiments of the process of the present invention include reacting a polymer with attached functional groups in a high-yield post-polymerization reaction, such as a click chemistry reaction. The attached functional groups may be, for example, telechelic functionality, site specific functionality, functionality dispersed along a polymer backbone or blocks of monomers comprising the functionality.

BACKGROUND OF THE INVENTION

Polymers with attached functional groups may be prepared directly by polymerization of functional monomers. Oligomers and polymers prepared by a controlled polymerization processes may have functionality at specific locations along the chain and a specific amount of functionality. For example, functional monomers may be placed periodically along the polymer chain, the initiator may have attached functionality, or the group providing for controlled polymerization may be removed and replaced with a desired functional group. However, there are several controlled polymerization processes and many functional monomers may not be directly copolymerized by every controlled polymerization process. Further, the monomers with desired functionality may not copolymerize in the desired manner using the selected controlled polymerization process. For instance, non-radical based polymerization processes are not as robust as radical polymerization processes, i.e., the polymerization processes are not able to tolerate a wide range of monomer functionality.

Controlled radical polymerization ("CRP") processes have been described by a number of workers in three ACS Symposium Series edited by Professor Matyjaszewski. [*ACS Symp. Ser*. Vol. 685, 1998; Vol. 768, 2000; and Vol. 854, 2003.] The use of a CRP for the preparation of an oligo/polymeric material allows control over the molecular weight, molecular weight distribution of the (co)polymer, topology, composition and functionality of a polymeric material. The topology can be controlled allowing the preparation of linear, star, graft or brush copolymers, formation of networks or dendritic or hyperbranched materials and can include such materials grown from any type of solid surface. Composition can be controlled to allow preparation of homopolymers, periodic copolymers, block copolymers, random copolymers, statistical copolymers, gradient copolymers, and graft copolymers. In a gradient copolymer, the gradient of compositional change of one or more comonomers units along a polymer segment can be controlled by controlling the instantaneous concentration of the monomer units in the copolymerization medium, for example. Molecular weight control is provided by a process having a substantially linear growth in molecular weight of the polymer with monomer conversion accompanied by essentially linear semilogarithmic kinetic plots for chain growth, in spite of any occurring terminations. Polymers from controlled polymerization processes typically have molecular weight distributions, characterized by the polydispersity index ("PDI"), of less than or equal to 2. The PDI is defined by the ratio of the weight average molecular weight to the number average molecular weight, $M_w/M_n$. More preferably in certain applications, polymers produced by controlled polymerization processes have a PDI of less than 1.5, and in certain embodiments, a PDI of less than 1.3 may be achieved.

Further functionality may be placed on the oligo/polymer structure including side-functional groups, end-functional groups providing homo- or hetero-telechelic materials or can comprise site specific functional groups, or multifunctional groups distributed as desired within the structure. The functionality can be dispersed functionality or can comprise functional segments. The composition of the polymer may comprise a wide range of radically (co)polymerizable monomers, thereby allowing the bulk or surface properties of a material to be tailored to the application. Materials prepared by other processes can be incorporated into the final structure as macromonomers, macroinitiators, or as other tele-functional materials or as substrates for CRP processes in either grafting from or grafting to processes. The term tele-functional material includes the materials normally considered to be macromonomers and macroinitiators but is used herein to indicate that other chain end functional materials can now be incorporated into a target structure by consideration of the terminal functionality and target coupling or linking reaction.

Polymerization processes performed under controlled polymerization conditions achieve these properties by consuming the initiator early in the polymerization process and, in at least one embodiment of controlled polymerization, an exchange between an active growing chain and dormant polymer chain that is equivalent to or faster than the propagation of the polymer. A CRP process is a process performed under controlled polymerization conditions with a chain growth process by a radical mechanism, such as, but not limited to; ATRP, stable free radical polymerization (SFRP), specifically, nitroxide mediated polymerization (NMP), reversible addition-fragmentation transfer (RAFT), degenerative transfer (DT), and catalytic chain transfer (CCT) radical systems. A feature of controlled radical polymerizations is the existence of equilibrium between active and dormant species. The exchange between the active and dormant species provides a slow chain growth relative to conventional radical polymerization, all polymer chains grow at the same rate, although overall rate of conversion can be comparable since often many more chains are growing. Typically, the concentration of radicals is maintained low enough to minimize termination reactions. This exchange, under appropriate conditions, also allows the quantitative initiation early in the process necessary for synthesizing polymers with special architecture and functionality. CRP processes may not eliminate the chain-breaking reactions; however, the fraction of chain-breaking reactions is significantly reduced from conventional polymerization processes and may comprise only 1-10% of all chains.

The initiator for a CRP can be a small molecule with additional functionality, an oligo/polymer chain with dispersed or terminal initiating functionality, or initiating functionality can be attached to any physical surface including particles of any composition or size and to flat surfaces. In this manner, functional particles or functional surfaces can be prepared. When only partial coverage of a surface is employed, an array of functional segments on a surface can be formed. Such a material would find utility of many bio-applications where the functional areas could be responsive to different peptides.

ATRP is one of the most successful controlled/"living" radical processes (also CRP) developed and has been thoroughly described in a series of co-assigned U.S. patents and applications, U.S. Pat. Nos. 5,763,548; 5,807,937; 5,789,487; 5,945,491; 6,111,022; 6,121,371; 6,124,411; 6,162,882; 6,407,187; 6,512,060; 6,538,091; 6,541,580; 6,624,262; 6,624,263 6,627,314; 6,759,49 and 6,790,9191 and U.S. patent application Ser. Nos. 09/359,359; 09/534,827; 10/034,908; 10/269,556; 10/289,545; 10/456,324; 10/625,890; 10/638,584; 10/684,137; 10/781,061; 10/788,995; 10/860,807, 10/992,249, and 60/611,853; all of which are herein incorporated by reference, and has been discussed in numerous publications by Matyjaszewski as co-author and reviewed in several publications.

Polymers produced by ATRP methods often contain a terminal halogen atom at the growing chain ends which can be efficiently modified in various end-group transformations, replacing terminal halogens with azides, amines, phosphines and other functionalities via nucleophilic substitution or radical addition and radical combination reactions. Indeed, this transformation chemistry can be conducted on any halogen terminated polymer including polymers prepared by cationic polymerization processes. However, ATRP is one of the most attractive techniques for the synthesis of well-defined end-functionalized polymers.

A group of high-yield chemical reactions were collectively termed "click chemistry" reactions by Sharpless in a review of several small molecule click chemistry reactions. [Kolb, H. C.; Finn, M. G.; Sharpless, K. B. *Angew. Chemie, Inter.l Ed.* 2001, 40, 2004-2021] As used herein, a "click chemistry reaction" is a reliable, high-yield, and selective reaction having a thermodynamic driving force of greater than or equal to 20 kcal/mol. Click chemistry reactions may be used for synthesis of molecules comprising heteroatom links. One of the most frequently used click chemistry reactions involves cycloaddition between azides and alkynyl/alkynes to form the linkage comprising a substituted or unsubstituted 1,2,3-triazole. Other click chemistry reactions are chemoselective or regioselective, only occur between alkynyl and azido functionalities with high yield of the 1,4-substituted triazole. Another click chemistry reaction comprises nucleophilic opening of strained ring systems. Typically, the ring opening of strained ring systems comprises three membered ring systems, such as epoxides, aziridines, cyclic sulfates, episulfonium ions, and aziridinium ions. Preferably, epoxides and aziridines are used. The click chemistry reaction is frequently performed in alcohol/water mixtures or in the absence of solvents and the products can be isolated in substantially quantitative yield. See Patton, Gregory C., Development and Applications of Click Chemistry, Nov. 8, 2004.

Selective copper-based click chemistry was described by Sharpless for the preparation of low molecular weight species; [Demko, Z. P.; Sharpless, K. B. *Angewandte Chemie, International Edition* 2002, 41, 2110-2113-2116] This reaction has been used by Sharpless to conduct a polymerization using two appropriate low molecular weight comonomers (a diazide and a dialkyne). [Punna, S. et. al. *Polym. Prep. Div. Polym. Chem.* 2004, 45, 778-779.] The resulting polymer had a broad MWD.

Tetrazoles, $RCN_4R'$, belong to a group of five-membered heterocycles, the azoles. Those with no substituent at any of the nitrogen atoms ($RCN_4H$) are acidic, with $pK_a$ values similar to carboxylic acids $RCO_2H$ ($pK_a$(tetrazole)=4.89, $pK_a$(5-methyltetrazole)=5.56, while $pK_a(CH_3CO_2H)=$ 4.75$^1$), and are thus sometimes referred to as "tetrazolic acids". Both classes of compounds dissociated at physiological pH; however, tetrazoles and tetrazolate anions are more lipophilic and more stable towards many metabolytic reactions than the carboxylates. These features make them important compounds for the design of drugs such as antibiotics, antiviral, antiallergic, antihypertensive, and radioprotective agents.

Some polytetrazoles have been prepared by the (co)polymerization of various vinyltetrazole monomers or by the post polymerization reaction of polyacrylonitrile with sodium azide and ammonium chloride. However, such polymers were not prepared using a controlled polymerization process and therefore do not have the properties, such as composition, molecular weight distribution, structure and topology of polymers prepared by controlled polymerization processes.

Traditional procedures for the direct preparation of tetrazoles in polymer backbones have recently been reviewed by Kizhnyaev, [Kizhnyaev, V. N.; Vereshchagin, L. I. *Russian Chemical Reviews* 2003, 72, 143-164] and described in; DE4211521 where the copolymerization of 2H-tetrazole with vinyl monomers provided homogeneous, reaction-processable polymers which are easily handled during processing. The copolymers, e.g., graft copolymers prepared from acrylonitrile, styrene, polybutadiene, and 5-phenyl-2-(4-vinylphenyl)-2H-tetrazole or 2-methyl-5-(4-vinylphenyl)-2H-tetrazole, are described as being useful alone or in blends [e.g., with poly(butylene terephthalate)] for the preparation of extruded articles showing high-impact strength, high heat deformation temperature, and good chemical resistance.

DE4211522 described that similar polymers, based on vinyl-aromatic monomers, 2H-tetrazoles with vinyl:phenyl substituents, and polydiene graft base are useful in preparation of a polymer membrane, useful for ultrafiltration, dialysis etc.

DE4222953 described the preparation of post-modifiable copolymers by emulsion copolymerization of styrene, acrylonitrile, and 2-methyl-5-(4-vinylphenyl)-2H-tetrazole that are processable by standard thermoplastic methods but could be modified by UV irradiation to provide surface crosslinking for improved impact and tensile strength. I.e., a low level of tetrazole functionality is incorporated by copolymerization and used to initiate a grafting to or a crosslinking reaction.

U.S. Pat. No. 3,397,186 indicated that triaminoguanidinium salts of 5-vinyltetrazole polymers are prepared by copolymerization and are useful as rocket fuel binders.

Stille described copolymerization of vinyl tetrazoles that allowed thermal crosslinking of copolymers containing dipolarophiles and the tetrazoles as nitrile imine dipol precursors. [Stille, J. K.; Gotter, L. D. *Kinet. Mech. Polyreactions, Int. Symp. Macromol. Chem., Prepr.* 1969, 1, 131-134; Stille, J. K.; Chen, A. T. *Macromolecules* 1972, 5, 377-384.]

The homopolymer of 2-(4-ethenyl)phenyl-5-phenyl-2H-tetrazole and its copolymers with styrene and acrylonitrile were prepared by Darkow. [Darkow, R.; Hartmann, U.; Tomaschewski, G. *Reactive & Functional Polymers* 1997, 32, 195-207.] The solution behavior of the tetrazole-containing polymers is dependent on the H-bond participation of tetrazole rings and by hydrophobic interactions between monomer groups. [Annenkov, V. V.; Kruglova, V. *Journal of Polymer Science, Part A: Polymer Chemistry* 1993, 31, 1903-1906.]

Polymers containing acrylonitrile functionality may be converted to polymers containing tetrazole functionality. U.S. Pat. No. 3,096,312 provides conditions for conversion of polyacrylonitrile to poly(5-vinyltetrazole) with a molecular weight distribution of greater than 2 by heating with NaN₃ and NH₄Cl in HCONMe₂ for 24 hours at 120-5 Degrees.

U.S. Pat. No. 3,350,374 describes the preparation of copolymers of hydroxytetrazoles and hydrazide oximes. These polymers were prepared by modification of another precursor polymer. The polymers are prepared from poly (hydroxamic acids) by treatment with SOCl2, giving poly (hydroxamyl chloride), which was then treated with hydrazine, giving the poly(hydrazide oxime). Treatment with NaNO2 and HCl gives a poly(azide oxime), which then rearranges to poly(hydroxytetrazole). The products are used as ion exchangers and explosives. The process is described as being less dangerous than the polymerization of a vinyltetrazole, but again, the initial polymers were not prepared by a controlled polymerization process and are therefore unable to be tailored to meet the requirements of property selective applications. In all prior publications and discussions on tetrazole-containing polymers, the copolymer had been prepared by standard polymerization processes; therefore, no control over any molecular parameter was possible.

Thus, there is a need for a method of preparing polymers, such as polytetrazole (co)polymers with controlled functionality, topology, and composition.

SUMMARY

The process of the present invention is directed toward conducting highly selective, high yield post polymerization reactions on polymers to prepare functionalized polymers. An embodiment of the present invention comprises conducting click chemistry reactions on polymers. Preferably, the polymers are prepared by controlled polymerization processes. Therefore, embodiments of the present invention comprise processes for the preparation of polymers comprising conducting a click chemistry reaction on a functional group attached to a polymer, wherein the polymer has a molecular weight distribution of less than 2.0. The functional polymers may be prepared by converting an attached functional unit on the polymer thereby providing site specific functional materials, site specific functional materials comprising additional functionality, or chair extended functional materials.

Embodiments of the process of the present invention also include chain extensions reactions by directly linking polymer chains or by using a linking compound. In addition, the linking reactant involved in the click chemistry reaction with the functional polymer may provide additional distributed functionality to the final polymer, such as linkages that may interact with bio-active species or molecules. The distributed functionality may comprise degradable functionality, such as biodegradable or photodegrable functionality.

Embodiments of the process of the present invention also include reacting a terminal group on a first polymer with a compound to form a polymer comprising groups capable of reacting in a click chemistry reaction and conducting a click chemistry reaction resulting in chain extending the functional polymers to form a higher molecular weight polymer. Such embodiments of the process of the present invention may also include reactions systems comprising multiple click chemistry reactions involving different reactive groups. Simultaneous multiple high yield chemistries may be performed if one reaction does not interfere with any of the other reactions, and may be used to prepare multi-segmented block copolymers, including, but not limited to, linear block, comb, graft, branched, bottlebrush, as well as other topologies, such as ABC, ABCABC or ABCD block copolymers by selecting the end functional groups on each precursor copolymer segment to allow only coupling or chain extension with the desired next polymer segment.

The click chemistry reactions of the present invention include reactions with polymers comprising side chain functionality capable of reacting in a click chemistry reaction. Such polymers include polymers comprising blocks of acrylonitrile monomers or derivatives of acrylonitrile monomers. Such embodiments may result in the formation of linear polymers with distributed functionality. When the click chemistry reaction is conducted between polymers comprising side chain functionality capable of reacting in a click chemistry reaction and polymers comprising corresponding terminal functionality capable of reacting in the same click chemistry reaction, the reaction may result in formation of graft copolymer. Click chemistry may be useful also for the formation of block copolymers when the polymers are attached to a polymer, particle or a substrate.

BRIEF DESCRIPTION OF THE FIGURERS

The features and advantages of the present invention may be better understood by reference to the accompanying figures, in which.

Figure 3:
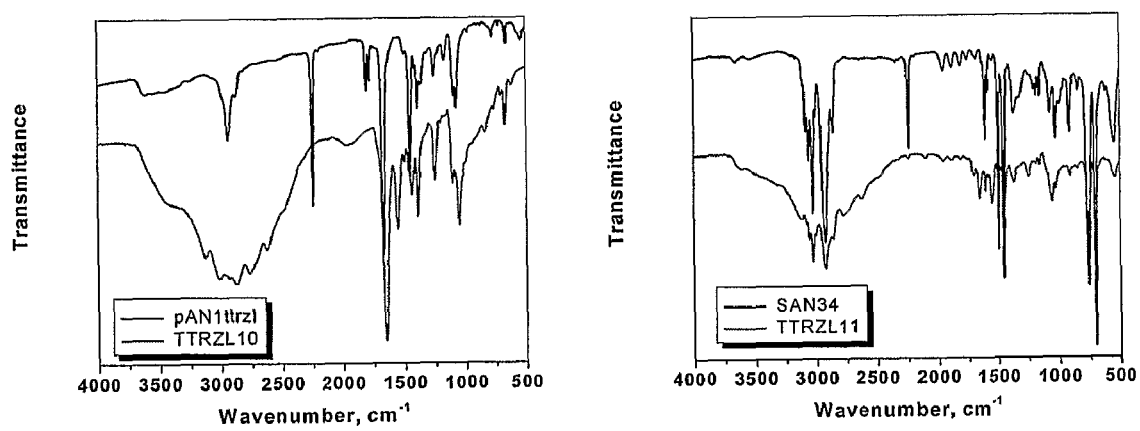
Figure 4:
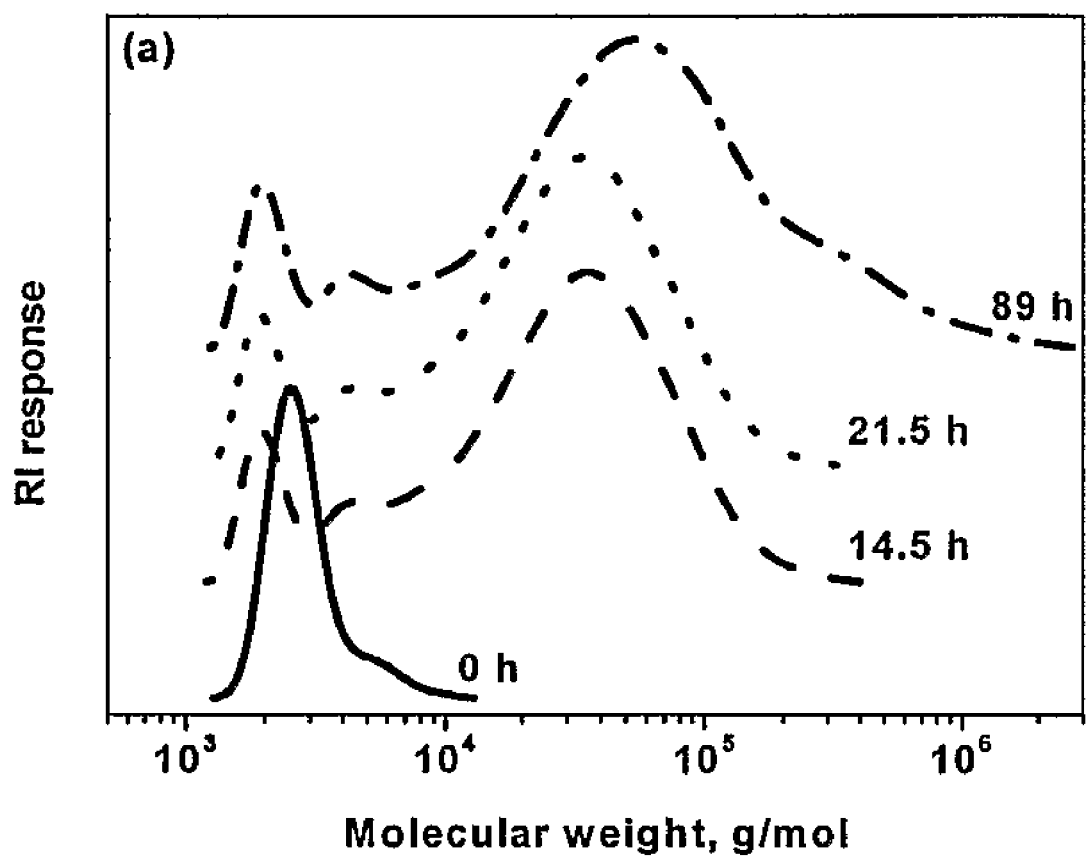

FIG. 3 is a graph showing the conversion of the nitrile groups in a SAN copolymer to tetrazole units, spectra were obtained from films cast from acetone (SAN34 and TTRZL11) or DMF (PAN1ttrzl and TTRZL10) onto KBr plates; and FIG. 4 is a graph showing the evolution of the SEC traces during step growth click coupling of (a) α-alkyne-ω-azido-terminated polystyrene after its isolation and mixing with CuBr in DMF.

DESCRIPTION OF EMBODIMENTS OF THE INVENTION

The process of the present invention is directed toward conducting highly selective, high yield post polymerization reactions on polymers to prepare functionalized polymers. An embodiment of the present invention comprises conducting click chemistry reactions on polymers prepared by a controlled polymerization processes. Therefore, embodiments of the present invention comprise processes for the preparation of polymers comprising conducting a click chemistry reaction on a functional group attached to a polymer, wherein the polymer has a molecular weight distribution of less than 2.0. The functional polymers may be prepared by converting an attached functional unit on the polymer thereby providing site specific functional materials, site specific functional materials comprising additional functionality, or chain extended functional materials.

All click chemistry reactions discussed by Sharpless are highly selective, high yield reactions that may be used for post-polymerization functionalization and chain extension chemistry as exemplified herein. Some further examples of reactions which are known to proceed in highly selective, high yield, and should not interfere one with another, or at least the products of these reactions should not interfere with the reagents used for another reaction, include, but are not limited to, a hydrosilation reaction of H—Si and simple non-activated vinyl compounds, urethane formation from alcohols and isocyanates, 2+3 cycloaddition of alkyl azides and acetylenes, Menshutkin reaction of tertiary amines with alkyl iodides or alkyl trifluoromethanesulfonates, Michael additions e.g. the very efficient maleimide-thiol reaction, atom transfer radical addition reactions between —SO2Cl and an olefin ($R^1, R^2$—C=C—$R^3, R^4$), metathesis, Staudinger reaction of phosphines with alkyl azides, oxidative coupling of thiols, many of the procedures already used in dendrimer synthesis, especially in a convergent approach, which require high selectivity and rates. Therefore, attached functionality may be chosen from acetylene bond, an azido-group, a nitrile group, acetylenic, amino group, phosphino group. The click chemistry reaction may result in the addition of a functional group selected from amino, primary amino, hydroxyl, sulfonate, benzotriazole, bromide, chloride, chloroformate, trimethylsilane, phosphonium bromide or bio-responsive functional group including polypeptides, proteins and nucleic acids to the polymer. Therefore, an embodiment of the process of the present invention comprises reacting a polymer comprising at least one nitrile group with an azide to form a polymer comprising at least one tetrazole ring. The azide may be a functionalized azide.

The advantages of performing click chemistry reaction on polymers produced by a controlled polymerization process is that the polymers with narrow molecular weight distribution and regular topology may be linked together in unique ways, functionalized at specific sites, or two ends of a polymer chain may be joined together to form cyclic polymers having a narrow molecular weight distribution. For example, block copolymers comprising monomers that may not readily copolymerize may be prepared by preparing the polymer segments separately, even by separate polymerization processes, and subsequently functionalizing the segments with functional capable of reacting in a click chemistry reaction. In this way, block copolymers may be prepared including AB copolymers, but also repeating $(AB)_n$, $(ABC)_n$ and $(ABCD)_n$ copolymers and such repeating block copolymers where n is greater than 1. Such block copolymers may be formed by the reaction between, for example, polymers of the formula Y—P—Z, where Y and Z are corresponding click chemistry reaction groups, and P may be a homopolymer, a copolymer, a block copolymer, a gradient copolymer, an alternating copolymer or any other polymeric topology. Additionally, polymers of the formula Y—P—Y may be reacted with linking compounds of the formula Z—R—Z, where the constituents are as defined above. Further multiple click chemistry reactions may be performed between polymers of the formula, such as, but not limited to, $Y^1$—P—$Z^2$, Y—$P^2$—$Z^1$, wherein $Y^1$ and $Z^1$ are corresponding click chemistry reaction groups and $Y^2$ and $Z^2$ are corresponding click chemistry reaction groups that will not react with either $Y^1$ or $Z^1$, hereby polymers comprising repeating structures such as $(AB)_n$, $(ABC)_n$ and $(ABCD)_n$ may be produced.

The selection of the reaction chemistry for each linking reaction should not interfere one with another. $y^1$ would only react with $z^1$, and $y^2$ would only react with $z^2$, etc. As noted above, the only requirement is that the functional groups in each generation do not interfere in the earlier linking chemical bond formation reactions. For example, one link could be formed by a hydrosilation reaction (A=H—Si and A'=an olefin), another link could be formed by an ATRA between —SO2Cl (B) and an olefin (B'=$R^1, R^2$—C=C—$R^3, R^4$); or through use of a 2+3 cycloaddition reaction between an acetylene and an alkyl azide via "click chemistry".

A problem that may likely be encountered in such embodiments may arise from the difficulty in finding a set of reactions which conform to the above criteria. For example, if one decides to employ a Michael reaction of electron-poor alkenes with primary or secondary amines, the latter may compete with any alcohols selected to participate in urethane formation. Similar interference will be encountered for a reaction between amines, carboxylic acids and Michael addition. Also, the very selective atom transfer radical addition of sulfonyl halides to alkenes should be used in the absence of amines or alcohols, etc. Nevertheless, these reactions could be still used in a one-pot but two-step approach, when the monomer utilizing amines as one functional group in the forming linking chemistry could be added only after the alcohol is totally consumed or sulfonyl halide reacted with alkenes.

For example, in one embodiment, a process for the preparation of regular linear multi-segmented block copolymers may comprise reacting polymers with selected terminal functionality such as A'-$P_1$—B, B'—$P_2$—C, C'—$P_3$-D and D'-$P_4$-A can use the selective linking chemistry to make a linear A'($P_1$)B:B'($P_2$)C:C'($P_3$)D:D'($P_4$)$_n$ multiblock segmented copolymer of controlled sequences of polymer segments, optionally with pre-selected chain end functionality.

The linking chemistry can be conducted in solution or in bulk. In the case of linking higher molecular weight polymer precursors, the "one pot" could be an extruder, preferentially a twin screw extruder with devolatization capabilities.

A further embodiment of the process of the present invention comprises reacting a first polymer comprising at least one nitrile group with an azide comprises reacting the first polymer with sodium azide and zinc chloride and wherein the molar ratio of sodium azide to nitrile groups and the molar ratio of zinc chloride to nitrile groups are both individually greater than 1.5. Embodiments of the processes of the present invention may preferably include reactions with polymers produced by a controlled polymerization processes such that the polymers have a molecular weight distribution of less than 2.0.

A particularly useful linking reaction is the copper-(I)-catalyzed 1,2,3-triazole formation from azides and polymers comprising terminal acetylenes, due to its high degree of dependability, complete specificity, and the bio-compatibility of the reactants. The click chemistry reactions may be used for transformation of functional groups attached to monomers, attachment of additional functional groups, clicking of telechelic groups on polymers for preparation of block copolymers, conducting linking reactions for formation of linear polymers with distributed functionality, or graft copolymers by "clicking to" a polymer, particle or substrate. The polymers of the present invention may thereby by supported on at least one of an inorganic support and an organic support, ion exchange resin, a silica particle, and a poly(styrene) particle.

For chain extensions reactions, for example, the reactant involved in the click chemistry reaction with the polymer may provide additional functionality to the new polymer, such as linkages that may interact with bio-active species or molecules. Embodiments of the process of the present invention also includes reacting a terminal group on a first polymer with a compound to form a polymer comprising groups capable of reacting in a click chemistry reaction and conducting a click chemistry reaction resulting in chain extending the functional polymers to form a higher molecular weight polymer. Such embodiments of the process of the present invention may also include reactions systems comprising multiple click chemistry reactions involving different reactive groups. Multiple high yield chemistries where one reaction does not interfere with any of the other reactions, may be used to prepare multi-segmented block copolymers, including, but not limited to, linear block, comb, graft, branched, bottlebrush, as well as other topologies, such as ABC or ABCD block copolymers by selecting the end functional groups on each precursor copolymer segment to allow only coupling or chain extension with the desired next polymer segment.

Embodiments of the process of the present invention also comprise linking polymers by reacting a linking compound by a click chemistry reaction with two or more polymers, wherein the polymers comprise corresponding click chemistry functionality. Such a chain extension reaction results in polymer segments with distributed linking groups. In some applications it may be preferable for the linkages to be distributed regularly along the polymer backbone or side chains. The distributed functionality may comprise degradable functionality.

The click chemistry reactions include reactions with polymers comprising side chain functionality capable of reacting in a click chemistry reaction. Such polymers include polymers comprising blocks of acrylonitrile monomers or derivatives of acrylonitrile monomers. Such embodiments may result in the formation of linear polymers with distributed functionality. When the click chemistry reaction is conducted between polymers comprising side chain functionality capable of reacting in a click chemistry reaction and polymers comprising corresponding terminal functionality capable of reacting in the same click chemistry reaction, the reaction may result in formation of graft copolymer. Click chemistry may be useful also for the formation of block copolymers when the first polymers are attached to a polymer, particle or a substrate. Polymerizations of polymers attached to a polymer backbone, a particle, or a substrate may result in a higher degree of termination reaction due to the proximity of the active propagating chain ends, therefore, click chemistry reactions wherein the adjacent polymers are not capable of reacting with each other, would result in a more efficient means extending such tethered polymers.

Further embodiments comprise functionalizing each terminal end of a polymer with corresponding click chemistry reaction functionality and reacting one end of the chain with the other in a ring closing reaction to form a macrocyclic polymer. Embodiments of the present invention also include functionalized polymers, such as a polymer comprising 5-vinyltetrazole monomer units and having a molecular weight distribution less than 2.0. The polymer may be one of a star block copolymer, a linear polymer, a branched polymer, a hyperbranched polymer, a dendritic polymer, a bottle-brush copolymer and a crosslinked structure, such as a block copolymer comprising a block of 5-vinyltetrazole monomer units. Multiblock copolymers may comprise at least two blocks comprising 5-vinyltetrazole monomer units. Such a block copolymer may further be capable of selective separation of closely related chemical species such as ions, proteins or nucleic acids via ionic bonding or complex formation.

Control over the distribution of the tetrazole functionality can improve the performance of the material in many applications, such as adding tetrazole functionality to a solid support, for example, an organic based support, such as a crosslinked polystyrene resin, or an inorganic support, such as $SiO_2$.

The Examples demonstrate a process for the initial preparation of homopolymers and block copolymers comprising a polyacrylonitrile segment or a styrene/acrylonitrile copolymer segment. The polyacrylonitrile block or statistical styrene/acrylonitrile copolymer block may be directly prepared as a bulk or solution processable material, may be directly grafted to a substrate, or may be attached to the substrate via a hydrophilic or hydrophobic spacer. Any material in a contacting solution may freely interact with the first functionality as well as with the tetrazole functionality. For many applications macrobeads allow easier separation from the reactants/products than nanocolloids and in such situations spacers can assist is ensuring good contact between the functional material and the desired reactant. By control over spacer length, composition, and distribution of the attached tetrazole functionality one can modify the distribution of the attached tetrazole functionality in the contacting medium and allow close approach of a reactant, such as DNA or a protein to the attached tetrazole functionality thereby promoting controlled DNA synthesis in a readily separable solid/liquid reaction medium. In addition, such materials may be separated using other methods. For example, the material comprises the tetrazole functionality may exhibit a lower solution critical temperature (LCST) thereby allowing a homogeneous solution reaction between the tetrazole and the contacting reactant at a first temperature while allowing solid/liquid separation to be conducted at a lower second temperature (for example if an additional block comprises at least one of dimethylacrylamide, butyl acrylate, dimethylaminoethyl methacrylate, diethyl acrylamide, and NIPAM).

Another route to preparation of a readily separable material comprising tetrazole functionality tetrazole functionality would be to prepare block copolymers with selectively separable segments, such as by the preparation of copolymers with a short polyacrylonitrile segment and a polyethylene glycol segment such a block copolymer would allow a reaction to be conducted in one medium then the tetrazole functional material could be removed by extraction with a solvent for the other polymer segment. An example of utility for such a material would be to use the azole functionality as a ligand for a transition metal and an attached stimuli-responsive or solvent specific polymer segment as a means to remove the catalyst complex from the reaction medium.

The synthetic freedom that allows one to target specific applications is further exemplified by segmented materials that are suitable for selective separation which can comprise segments with dimethylacrylamide/butyl acrylate (DMAA/BA), with dimethylaminoethyl methacrylate (DMAEMA) and with diethyl acrylamide (DEAA), or with NIPAM which can be prepared by RAFT.

A further process that would assist in the preparation and purification of bio-responsive products would be to attach the tetrazole functionality to a support with a cleavable functional group and once the sequence of DNA had formed the polymer could be selectively cleaved from the support prior to deprotection.

A further use for block copolymers with tetrazole functionality would be the formation of coatings where the first of post-polymerization functionalized (co)polymer can phase separate into discrete nano-domains such as formation of free standing films wherein the isolated tetrazole segments could form iron (II) complexes that could undergo separate spin-spin transitions under stimulation thereby storing information.

Another use for polymers, particularly dendritic or hyperbranched polymers with attached tetrazole functionality would be to use such a system for solid explosives. Such a material with high concentration of tetrazole functionality could be prepared by synthesis or a normal or hyperbranched polyacrylonitrile-Br polymer followed by conversion of the acrylonitrile functionality to tetrazole functionality and the bromo-functionality to azide.

Block copolymers and statistical copolymers of styrene and acrylonitrile were synthesized, halogen exchange was used to prepare well defined polyacrylonitrile blocks from a polystyrene macroinitiator. The nitrile groups were modified to tetrazole units using the chemistry shown in scheme 1.

Scheme 1. Chemical modifications of the nitrile group in copolymers of STY and AN

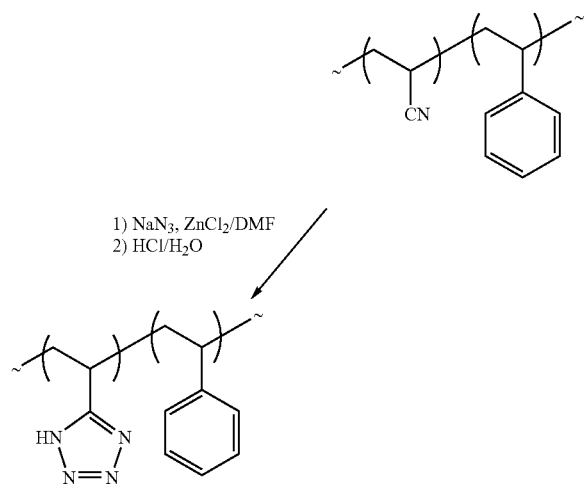

The ionomers with random or blocky structures containing amino and tetrazole groups were studied for aggregation in solution, complex-formation, and morphology. The tetrazole-containing polymers will be tested as materials for the synthesis of DNA.

Other polyacrylonitrile block copolymers that were converted to polytetrazole block copolymers were linear block copolymers with polyethylene oxide and star block copolymers with a poly(butyl acrylate) core, thereby exemplifying the broad scope of copolymerizable monomers.

The nitrile groups of styrene-acrylonitrile based copolymers were successfully transformed to tetrazole units by the reaction with zinc chloride and sodium azide in DMF. The ionomer initially obtained, using published procedures for the preparation of low molecular weight species or indeed as recommended below with an even greater excess of sodium azide, up to 2:1 ratio, still contained acrylonitrile units (see the NMR spectrum in FIG. 1), but had drastically different properties from the starting material, for example; it dissolved in methanol and swelled in water. Increasing the molar ratio of sodium azide to nitrile units above the ratio of 1:1.3 provided (co)polymers with complete conversion of the nitrile unit to tetrazole.

A second series of Examples describes a combination of high yield chemistry and ATRP leading to the preparation site specific and homo-functional polymers. Telechelic polymers with different chain end functionality can be used for inter- and intra-molecular click coupling reactions. Embodiments of the present invention include a method of preparing molecular brushes with block copolymer architecture in both the backbone and direction of the tethered graft block copolymers. These materials could be examples of a unimolecular cylindrical Janus micelle, and the aggregation behavior in solution and bulk phases is expected to be interesting. With the exception of relatively short blocks being added to molecular brushes via grafting through of macromonomers, the synthesis of multi-segmented block brush copolymers has remained elusive and the chemistry described herein provides an expedient approach to synthesize such molecules.

The use of high yield post-polymerization chemistry in combination with polymers prepared by controlled polymerization procedures including ionic polymerization processes and CRP should allow for the preparation of well-defined complex structures such as molecular brushes with blocky structure or "heterogeneous" brushes with random incorporation of two different side chains (Scheme 2). For example, monomers with an acetylene bond incorporated into a polymer by a CRP may be converted to an initiating group for a grafting from reaction using azido-group-containing initiator or vice versa. This chemistry can also be used to attach a second desired functionality, such as halogen, primary amine, phosphorous group, silane or siloxane or functionality that can bind to bio-responsive materials at any site along the polymer chain.

Scheme 2. Stragety for the preparation of "heterogeneous" brushes by a combination of ATRP and "click chemistry" reactions.

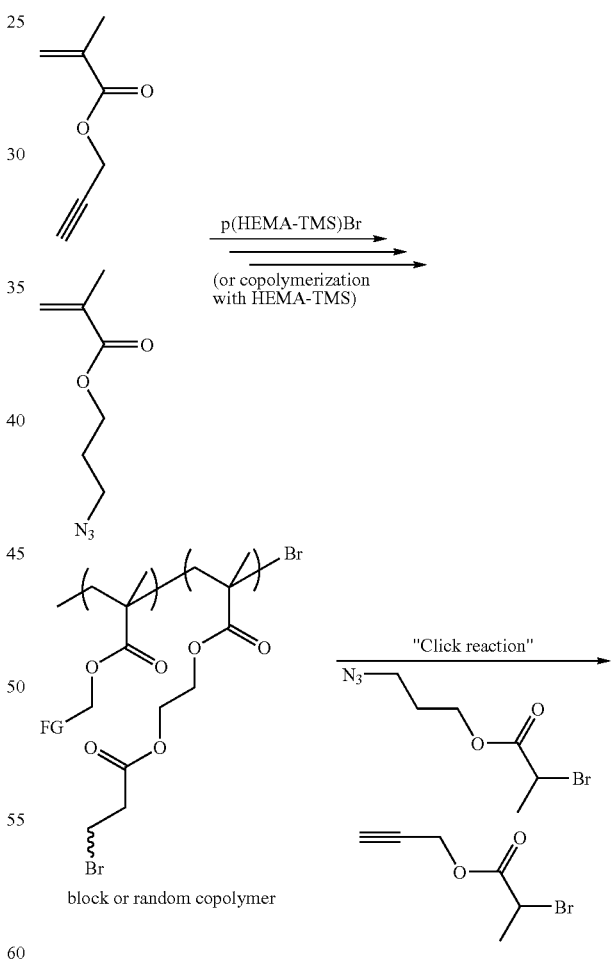

The utility of this approach to functional polymers is exemplified by the preparation of homopolymers of 3-azidopropyl methacrylate by ATRP and by RAFT, followed by attachment of a hydroxyl group at each functional monomer unit along the backbone by a click chemistry reaction with propargyl alcohol.

There is a multiplicity of azido-monomers that can be synthesized and used in the preparation of a (co)polymer and this is further exemplified below by synthesis and polymerization of 4-vinylbenzyl azide. Similarly, most radically copolymerizable monomer can be modified to include substituent that can participate in a post-polymerization reaction. This, therefore, provides complete synthetic freedom for the preparation of the first functional copolymer since comonomers with appropriate reactivity can be selected to form random, statistical or gradient copolymers or segment of a linear copolymer, a block copolymer, a star copolymer, a graft copolymer or a copolymer with more complex topology.

Further there is a multiplicity of propargyl derivatives available commercially. Propagyl derivatives may be used in a similar manner to attach a third functionality to an azido-group at any specific site on a polymer or particle. For example, propargyl amine can be used to attach primary amine functionality to each monomer site since monomers containing primary amine groups may not be readily polymerized by CRP processes. Propargyl benzene sulfonate may be used to attach a sulfonate group to a monomer, chain end, or segment comprising azido units. Other propagyl derivatives include functionality that can be introduced after a visit to Aldrich includes: benzotriazole, bromide, chloride, chloroformate, trimethylsilane, or phosphonium bromide functionality. Indeed, the ready availability of propargyl bromide allows the preparation of other propargyl derivatives since allylic nucleophilic substitution and also "propargylic" substitution are particularly easy. This indicates the ease of attaching any desired functionality to a preformed functional polymer by utilizing the chemistry discussed herein. As noted above in scheme 2, the added functionality can further comprise an initiator for a CRP thereby allowing the formation of heterograft brush copolymers or double graft brush copolymers.

Therefore, embodiments of the present invention include reacting propargyl compounds and derivative such as, but not limited to, the ones defined as

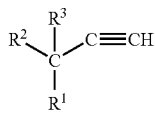

$R^1$, $R^2$, and $R^3$ may independently be H, halogen, Cl, Br, OH, $NH_3$, alkyl, aryl, alkoxy, $-OR^7$, alkyl amine, $-NHR^7$, $-N(R^7)_2$, substituted or unsubstituted phenyl, phenyl sulfonate, benzotriazole, haloformate, trialkylsilane, phosphonium halide, or $-SR^7$; wherein $R^7$ is independently selected from one of an alkyl group or an aryl group The attached functionality can be the final desired functionality in the material or can be employed in subsequent reactions to attach additional groups or interact with responsive materials including bio-responsive materials, such as proteins with chain end functionality.

The triazole products may be more than just passive linkers, for example, triazoles readily associate with biological targets, through hydrogen bonding and dipole interactions and as such may preferentially be placed near the shell of the final structure, or near an incorporated oligo/polymeric segment, to allow the greater free volume of the selected environment to accommodate an added agent.

The high yield post-polymerization chemistry can also be used in chain extension chemistry. This is exemplified below by chain extension of both homotelechelic polystyrene and hetero-telechelic polystyrene, but can be applied to polymers of any composition. Indeed the chemistry can be used to couple block copolymers together to form multi-block segmented copolymers. A tele-functional AB block copolymer with attached click chemistry functionality would form an $(AB)_n$ segmented copolymer and an ABC block copolymer would similarly form a regular $(ABC)_n$ multiblock copolymer. Multi-segmented linear block copolymers with well defined segments have not been readily prepared before.

Further the disclosed process could be a preferential route for the synthesis of ABC block copolymers of various topology including stars and graft copolymers where the A block, B block and C block are not readily copolymerized in sequence. Each segment may be prepared individually and then the final copolymer assembled in either a single step or a dual step clicking together reaction using single or multiple click chemistries to attain the final polymer structure.

Further as disclosed below in the examples the process of the present invention additionally provides a route for the high yield preparation of macro-cyclic copolymers, a species of polymer hitherto difficult to prepare. The % cyclization from a given telechelic copolymer may be controlled by selection of the solvent for the first linear copolymer. A poor solvent is preferred in order to modify the solution morphology of the copolymer to a preferred globular structure. The solvating power of a good solvent for the linear copolymer can be modified by addition of a miscible poor solvent or non-solvent to attain the desired collapsed structure. The result is that the predominant product from a click coupling reaction can be a cyclic polymer.

EXAMPLES

Preparation of Copolymers of Acrylonitrile with Controlled Molecular Weight, Topology and Functionality and their Chemical Modification to Polytetrazole Containing Materials The 1,3-dipolar cycloaddition of azide to organic nitrites in the presence of a protic or Lewis acid leading to 5-substituted tetrazoles, as shown in Scheme 1, is an example of "click chemistry" or a high yield post polymerization reaction. The tetrazole synthesis is usually carried out at high temperatures (above 100° C.) in polar solvents such as DMF, DMSO, butanol, or in aqueous media. Hydrazoic acid can be directly used to form the azole ring but since it is a highly toxic and explosive substance, other acids are preferably employed, in conjunction with a source of azide. Examples of acidic compounds include trifluoroacetic acid, aluminum or tin compounds, and ammonium salts. Zinc halides are quite efficient and the chloride was used in the present work Example 1

Figure 2:
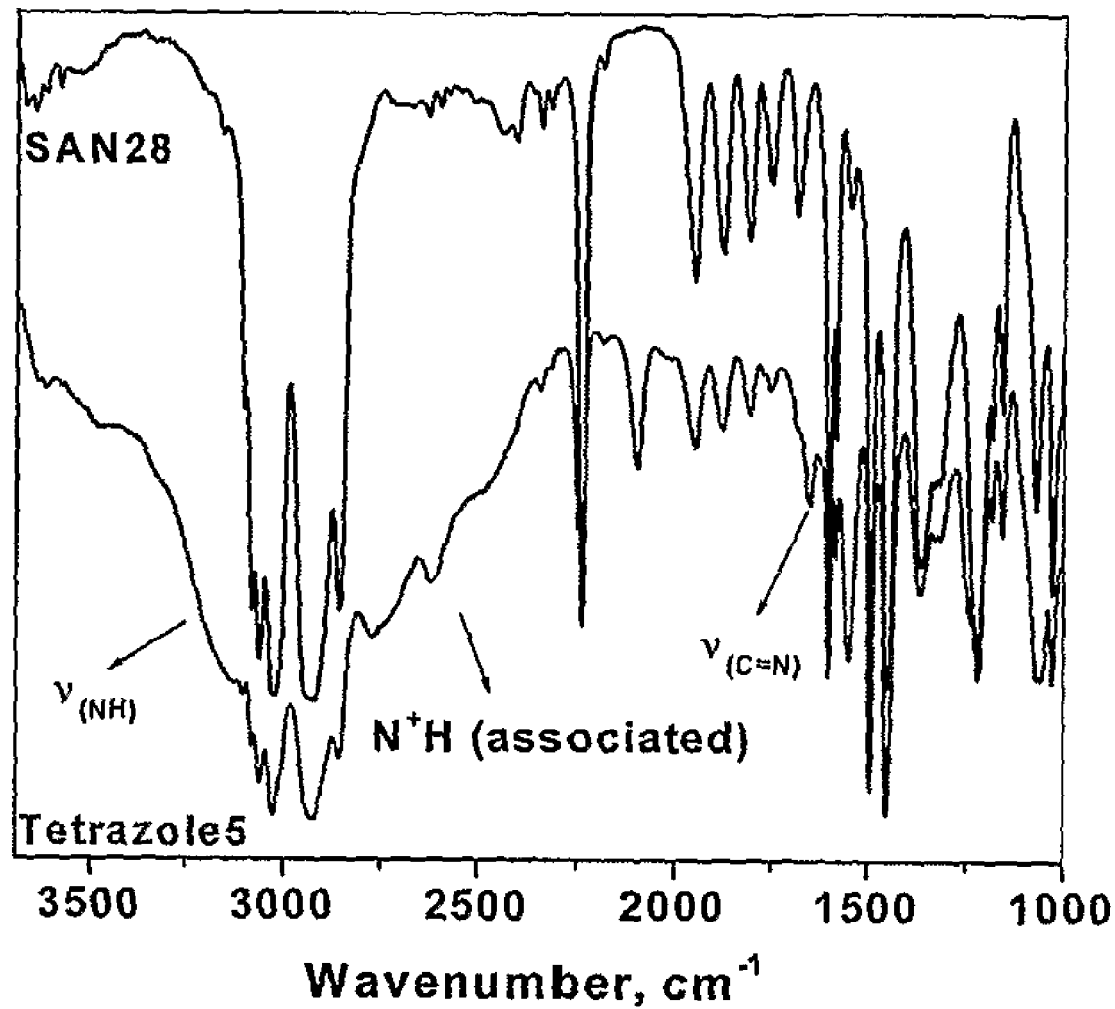
FIG. 2 is a graph of IR spectra, films from chloroform on a NaCl plate, of poly(styrene-b-acrylonitrile) copolymer ("SAN") and the product of its tetrazolation, showing the presence of a new band at 1653 cm$^{-1}$, as well as the broad band from 2800 to 2300 cm$^{-1}$) corresponding to associated NH bonds.

Conversion of the Nitrile Groups in a SAN Copolymer to Tetrazole Unit 2.79 g (0.3 mmol, corresponding to approximately 0.012 mol of nitrile groups) of a styrene/acrylonitrile copolymer (SAN28 $M_n$=9260 g/mol, PDI=1.14) was dissolved in 10 ml of DMF. 1.56 g (0.024 mol) of sodium azide and 3.27 g (0.024 mol) of zinc chloride were then added and the mixture was stirred at 100° C. for 24 h. After about 4 h, the salts had almost completely dissolved. A mixture of 200 ml of water and 15 ml of concentrated hydrochloric acid was separately prepared. 2 ml of this mixture was added to the reaction mixture (the latter had been cooled down to 60° C.), and the obtained suspension of polymer was stirred at 60° C. for 2 h. The polymer was then precipitated in the same dilute hydrochloric acid. The resulting suspension was stirred at room temperature overnight. The filtered polymer washed with water and methanol on the filter. It was then dissolved in DMF (20 ml), and the turbid mixture was poured in the same amount of dilute HCl as before. The polymer was filtered, washed with water and methanol, and dried. These purification steps are necessary to remove the inorganic salts (especially the zinc salts which hydrolyze forming products that are insoluble in water but soluble in HCl). Finally, the polymer was dissolved in 15 ml of acetone, filtered and precipitated in 200 ml of water. After cooling the suspension in a refrigerator, the suspension was filtered and the polymer was dried and analyzed by IR spectroscopy (film from chloroform on a NaCl plate). All characteristic peaks of poly(5-vinyltetrazole) were observed, see FIG. 2. It should be noted that the band of the nitrile group did not completely disappear in the prepared polytetrazole.

Figure 1:
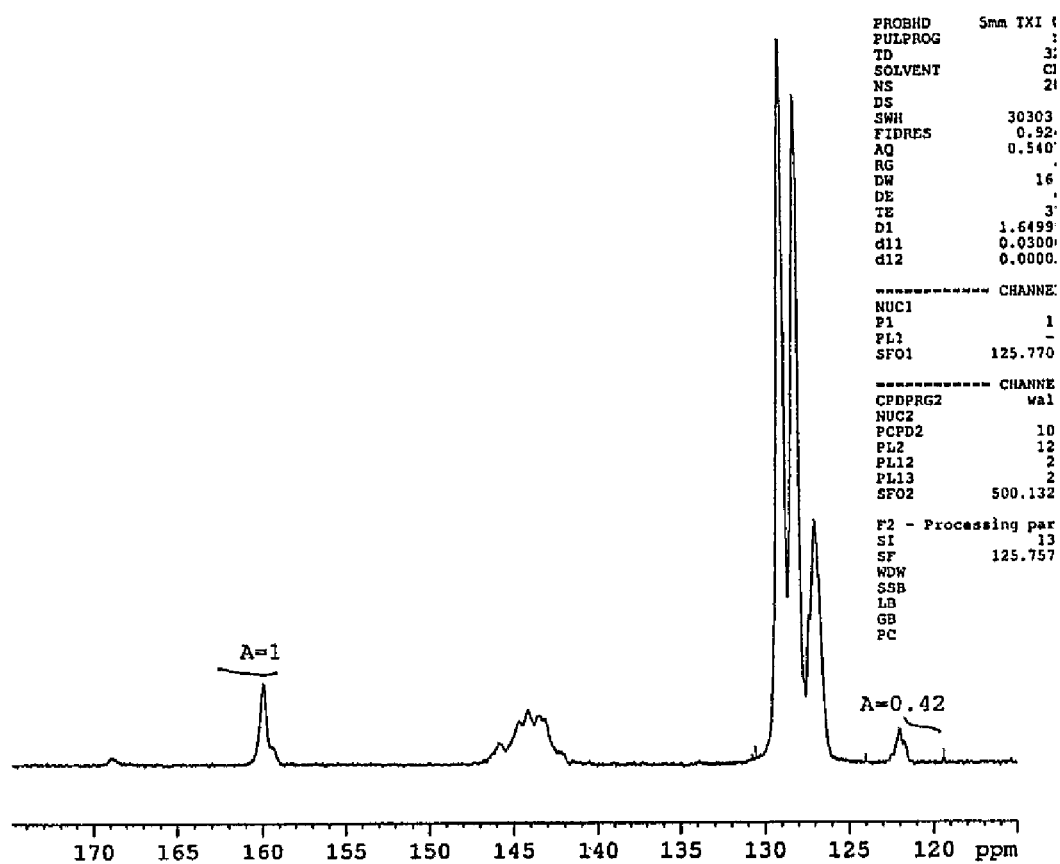
FIG. 1 is a graph of an NMR spectrum of copolymer formed after tetrolization of a styrene acrylonitrile copolymer.

These terazolation reactions on SAN copolymers yielded methanol-soluble polymers with high tetrazole content. The copolymer was characterized by $^{13}C$ NMR spectroscopy (FIG. 1). The peak at 157 ppm is due to the carbon atom from the tetrazole ring, and the peak a 120 ppm is due to nitrile carbon atoms. The tertiary carbon atom of polystyrene resonates at 145-148 ppm. The carbon atoms of the macrochain of poly(5-vinyltetrazole) absorb at 37-38 ppm (the peaks of these from PAN are situated at 27-28 ppm and from polystyrene—at 40-48 ppm). Therefore, the degree of tetrazolation is approximately 70%.

Example 2

Synthesis of Block (Co)Polymers Containing Tetrazole Groups by ATRP

Two different block copolymers of styrene and acrylonitrile were prepared. $Sty_{190}AN_{38}$ and $Sty_{190}AN_{10}$. These polymers were then converted to tetrazole-containing copolymer by the reaction with excess molar levels of sodium azide in the presence of zinc chloride.

Example 2a

Preparation of Diblock Copolymers of Styrene and Acrylonitrile Using Halogen Exchange to Prepare Narrow Molecular Weight Polyacrylonitrile Blocks 6.93 g of a pStyBr macroinitiator (Mn=19800 g/mol) was dissolved in a mixture of 14 ml of DMF and 10.5 ml of AN added. The catalyst complex for the ATRP consisted of 0.035 g CuCl and 0.109 g bpy. The polymerizations were performed at 80° C. The results are presented in Table 1.

TABLE 1

Preparation of poly(styene-b-acrylonitrile) copolymers

| Entry | Time of pzn, min | Conv (GC) | Mn, g/mol (GPC, conv., and NMR) [DP of AN block by NMR] | PDI |
|---|---|---|---|---|
| Sty-b-AN3 | 90 | 0.140 | 21700, 21200 [36] | 1.16 |
| Sty-b-AN4 | 25 | 0.052 | 20500, 20400 [10] | 1.13 |

The two copolymers with pAN blocks of DP=10 and 38 were used for the preparation of the corresponding block-tetrazoles and block-amines copolymers. The micellular association of these block copolymers in solution will be studied, as well as using them as a template for absorption of metal ions.

Example 2b

Preparation of tetrazole containing block copolymers from diblock copolymers of Sty and AN (Sty-b-AN3 [DP of AN=36] and Sty-b-AN4 [DP of AN=10])

The block copolymers of styrene and acrylonitrile prepared above, ($Sty_{190}AN_{38}$ and $Sty_{190}AN_{10}$) were reacted with 4 equivalents of the salts and the reaction was complete in approximately 50 hours.

Example 2b1

2.5 g (4 mmol of nitrile groups) of the polymer Sty-b-AN3 was dissolved in 10 ml of DMF. 1.04 g (16 mmol) of sodium azide and 2.18 g (16 mmol) of anhydrous zinc chloride were added and the mixture was heated (using a reflux condenser) to 120° C. for 50 h. Then it was cooled down to 60° C. and 2 ml of HCl (1:10 by volume in water) was added. The mixture was stirred for 2 hours and the polymer was precipitated in 200 ml (1:10) HCl. Based on IR spectral analysis, almost complete conversion of nitrile groups to tetrazole units took place.

Example 2b2

2.5 g (1.23 mmol of nitrile groups) of the polymer Sty-b-AN4 was dissolved in 10 ml of DMF. 0.32 g (4.9 mmol) of sodium azide and 0.67 g (4.9 mmol) of anhydrous zinc chloride were added and the mixture was heated (using a reflux condenser) to 120° C. for 50 h. Then it was cooled down to 60° C. and 2 ml of HCl (1:10 by volume in water) was added. The mixture was stirred for 2 hours and the polymer was precipitated in 200 ml (1:10) HCl. Based on IR spectral analysis, almost complete conversion of nitrile groups to tetrazole units took place.

A segmented block copolymer with aligned tetrazole functionality of degree of polymerization close to ten is expected to provide a molecularly isolated complex with Fe(II) complexes that will display spin-spin transitions under stimulation thereby storing information at the molecular level. The presence of a polystyrene block will allow the formation of coherent coatings or free standing films. Other segments can also be employed.

Example 3

Synthesis of AN-BA Diblock Copolymer

A pBA-based macroinitiator was prepared by ATRP of BA (50 ml, with 2 ml of diphenyl ether added as internal GC standard) in the presence of CuBr (0.0784 g)/PMDETA (112 μl) complex, initiated by MBP (64 μl). The polymerization was carried out at 70° C. for 23.5 h (conversion by GC was 62.7%). The product was dissolved in ca. 300 ml of THF and the copper complexes were removed by passing the solution through a column filled with neutral alumina. The solvent was then evaporated providing a polymer with Mn=68.7 kg/mol, PDI=1.09 (pSty standards).

17.66 g of the macroinitiator was dissolved in a mixture of 50 ml of AN and 20 ml of DMF. The chain-extension was catalyzed by CuCl/bpy. The reaction was carried out at 70° C.

for 21.5 h. The polymer was precipitated in methanol, and analyzed by GPC: Mn=92.4 kg/mol, PDI=1.18 (pSty standards).

This result proves the earlier observations that DMF is the solvent of choice for the preparation of acrylonitrile copolymers of high molecular weight. This copolymer had a cylindrical morphology.

Example 4

Tethered Tetrazole (Co)Polymers

A polyacrylonitrile homopolymer and a styrene/acrylonitrile copolymer both attached to silica particles and crosslinked polystyrene particles were also converted to tetrazoles. Based on IR spectral analysis, no unreacted nitrile groups were left in the samples.

Example 4a

The general procedure for conversion of nitrile functionality in these Examples was as follows. The measured amount of the tethered (co)polymer was dissolved in DMF, and $NaN_3$ and anhydrous $ZnCl_2$ (4 equivalents vs. CN) were added. The mixture was stirred at 120° C. for 50 h, then cooled to 60° C. and a solution of HCl (1:10 in water) was added. The reaction mixture was stirred at this temperature for 3-5 h, and the product was precipitated in large excess of the same HCl solution. The polymer was stirred with the HCl overnight at room temperature, filtered, washed on the filter with the same HCl solution and then with water and dried. Experimental details are summarized in Table 2.

ated ATRP. In order to obtain a low-polydispersity Sty-AN block copolymer, the poly-AN block should be synthesized first and the polyANBr macroinitiator chain-extended with Sty. All nitrile-group-containing polymeric materials were modified to the corresponding tetrazoles using the reaction with sodium azide and zinc chloride in DMF. The optimum results were achieved when the reaction was carried out at 120° C. for 50 h using a ratio of the reagents $NaN_3$:$ZnCl_2$:RCN equal to 4:4:1. The tetrazole-based polyacids prepared by this "click chemistry" reaction were characterized by IR and $^{13}C$ NMR spectroscopy. The 5VT homo and random copolymers had markedly better solubilities in protic solvents than the starting materials being soluble in alkaline aqueous solutions.

Click chemistry may be used to convert —C≡N groups on polymers with degrees of polymerization of less than 2.0 to tetrazole groups. Hybrid copolymers comprising a copolymer tethered to a solid may also be modified thereby preparing functional micro- or macro-particles.

Example 5

Examples of Other High Yield Post-Polymerization Functionalization Chemistry

The approach shown above in Scheme 2 is exemplified by synthesis and use of an azido-group-containing monomer (3-azidopropyl methacrylate) and acetylene-group-containing initiator (propargyl 2-bromoisobutyrate) and their incorporation into polymers of controlled structure.

TABLE 2

Tetrazolation reactions

| Experiment | Polymer | Reagents | HCl (1:10) | Properties |
|---|---|---|---|---|
| ttrzl9 | SAN-SiO$_2$ (L.B.) - 1.4 g (0.006 mol CN) in 10 mL DMF | 1.56 g NaN$_3$ and 3.27 g ZnCl$_2$ (0.024 mol) | 2 mL; 5 h at 60° C. | — |
| ttrzl10 | PAN1ttrzl (Mn (GPC) = 39540 g/mol, PDI = 1.08), 1.06 g (0.02 mol CN) in 20 mL DMF | 5.2 g NaN$_3$ and 10.9 g ZnCl$_2$ (0.08 mol) | 15 mL; 3 h at 60° C. (brown solution forms) | Sol. DMF (heating), aq. NaOH; insol. H$_2$O, MeOH, acetone |
| ttrzl11 | SAN34 (Mn = 8460 g/mol, PDI = 1.08), 2.79 g (0.012 mol CN) in 20 mL DMF | 3.12 g NaN$_3$ and 6.54 g ZnCl$_2$ (0.048 mol) | 10 mL; 4 h at 60° C. (in ca. 1 h, solution forms) | Sol. MeOH, aq. NaOH, acetone |

The IR spectra of the starting nitrile-containing polymers and the tetrazoles prepared therefrom are shown in FIG. 3. As can be seen from the spectra, it appears the nitrile groups were completely converted to tetrazole functionality.

Example 4b

Polystyrene particles functionalized with ATRP initiating groups were purchased from Aldrich and were grafted from and functionalized as described above. Tetrazole encapsulated polystyrene particles could be used as a substrate in a gel packed column.

In this initial example of post-polymerization functionalization well-defined homo- and copolymers (both random and block, including supported polymers on polystyrene or silica particles) of AN were synthesized using copper-medi- Example 5a Synthesis of 3-azidopropanol Several conditions were tested for the conversion of 3-halopropanols to 3-azidopropanol (neat liquids vs. solutions, addition of phase transfer catalyst, various temperatures) and the method presented here was the best (all others led to incomplete conversion). It produced very clean alcohol, which can be converted to the corresponding methacrylate.

30 mL of 3-chloropropanol (33.93 g, 0.358 mol) were added to a mixture of 40 mL of water, 47 g (twofold excess to the alcohol) of sodium azide and 1 g of tetrabutylammonium hydrogensulfate. The mixture was stirred at 80° C. for 24 hours and then at room temperature overnight (13-14 h). The product was extracted with three portions (80-90 mL each) of ether, the combined ether solutions were dried over sodium sulfate and the solvent was removed on rotary evaporator. Thus 35.5 g of crude product was obtained. The 3-azidopropanol was distilled under vacuum. Yield: 30.8 g (0.305 mol, 85%). $^1$H NMR in chloroform (δ, ppm): 3.76 (t, 2H, CH$_2$O), 3.46 (t, 2H, CH$_2$N$_3$), and 1.84 (tt, 2H, CCH$_2$C). No unreacted 3-chloropropanol was seen by NMR (its peaks in CDCl$_3$ are observed at 3.80 (t, 2H, CH$_2$O), 3.68 (t, 2H, CH$_2$Cl) and 2.01 (tt, 2H, CCH$_2$C) ppm).

Example 5b

Synthesis of 3-azidopropyl methacrylate 29 mL (0.3 mol) of methacryloyl chloride was added to a mixture of 100 mL methylene chloride and 50 mL of pyridine (both solvents had been dried over sodium sulfate overnight). The suspension was cooled in an ice-water bath and 18.6 mL (0.2 mol) of 3-azidopropanol was added over a period of 10 minutes. A clear solution was formed, which was kept in the cooling bath for another 1 hour and then at room temperature for 24 h. 50 mL of methylene chloride were then added, and the mixture was extracted with a solution of 50 mL HCl in 300 mL water followed by four 200-milliliter portions of water (NaCl had to be added to break the stable emulsion). The methylene chloride layer was dried over sodium sulfate (5 grams of sodium carbonate were added to react with the excess of methacrylic acid potentially present), and the solvent was removed under vacuum. The obtained liquid was distilled under reduced pressure (0.1 g of hydroquinone was added to prevent polymerization). The yield was 8.55 g (25%). The procedure needs to be optimized, but the monomer obtained by this procedure was very pure (NMR) and was used to study polymerization reactions.

Example 5c

ATRP of 3-azidopropyl methacrylate (AzPrMA)

The ratio of reagents were AzPrMA—2 mL (2.18 g, 0.0129 mol); acetone—2 mL, Ph$_2$O—0.15 mL; CuBr—0.0093 g (0.0645 mmol, 1/200 vs. monomer); Bpy—0.00202 g
EBiB—9.5 µL (1/200 vs. monomer); reaction temperature 50° C. The mixture of monomer and solvents was degassed by 5 freeze-pump-thaw cycles, and the complex components were added to the frozen mixture. The tube was closed and back-filled with nitrogen. After dissolving the complex and heating the reaction mixture, EBiB was injected. The results are presented below.

| Sample | Time, min | Conv. (GC) | Mn, g/mol* | PDI* |
|---|---|---|---|---|
| 1 | 65 | 0.171 | 6130 | 1.32 |
| 2 | 135 | 0.230 | 8090 | 1.36 |
| 3 | 210 | 0.290 | 9010 | 1.38 |
| 4 | 330 | 0.337 | 10580 | 1.42 |
| 5 | 480 | 0.431 | 12320 | 1.44 |

*Using polyMMA calibration

Example 5d

3-Azidopropyl Methacrylate Polymerized Using RAFT Conditions ([APMA]:[CDB]:[AIBN]=203:1:0.2, T=60° C.).
The kinetics, MW vs. conversion, MWDs, and other data indicated a well controlled polymerization. While usually RAFT polymerizations of methacrylates are relatively fast with linear pseudo first-order kinetics, there was a slight inhibition period observed during this polymerization nevertheless a DP>100 is attainable, and this could be sufficient for composing a portion of a block copolymer brush.

Example 5e

Click Chemistry of poly(3-azidopropyl methacrylate) and propargyl Alcohol

The final polymer from the previous experiment, (5c), (0.09 g, 0.53 mmol of azide groups) and 31 µL (0.53 mmol) of propargyl alcohol were dissolved in 1 mL of deuterated DMF. Nitrogen was bubbled through the solution for 15 min. In a NMR tube, 0.0076 g (0.053 mmol) of CuBr was put and the air in the tube was replaced with nitrogen. 0.85 mL of the above solution was injected and the tube was kept at 27° C. The CuBr quickly dissolved forming a yellow solution. After 5 hours, the NMR spectrum clearly indicated the formation of the triazole (peaks appeared at 8.15 ppm, corresponding to CH from the triazole ring, and at 5.40 ppm, corresponding probably to CH$_2$O connected to the aromatic ring. The spectrum did not change anymore even after 25 hours, indicating that the reaction was complete. This preliminary result indicates that click chemistry reaction can be successfully carried out in non-aqueous solvent, and is quite fast (often authors report reaction times of 20 hours or longer). In addition, the Cu$^I$ source does not require a ligand (perhaps the solvent serves as such), which is useful for the attachment of propargyl 2-bromoisobutyrate to the azide monomer (which, in the presence of a ligand is more likely to react with the CuX forming radicals). In this way ATRP initiating sites were attached to the first polymer backbone for a grafting from reaction.

Example 5f

Preparation of 4-vinylbenzyl azide

Freshly distilled 4-vinylbenzyl chloride (4VBC) was reacted with NaN$_3$ (25 wt % in water) using the conditions we generally employ to modify the halogen containing end groups obtained by ATRP to azide groups (Scheme 3).

Scheme 3. Synthesis of 4-vinylbenzyl azide and RAFT polymerization

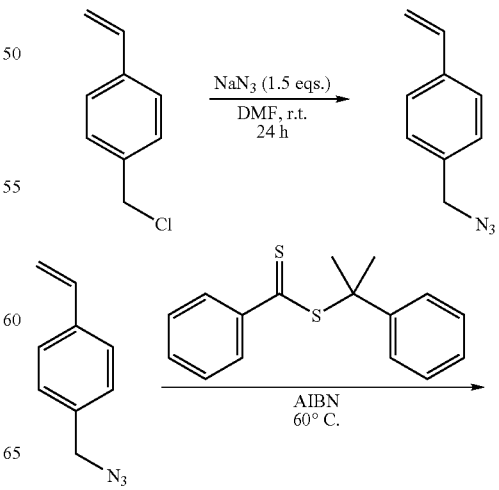

-continued

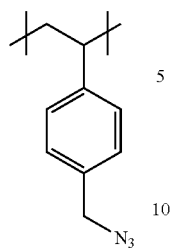

This approach was successful with nearly none of the starting product being observed in the $^1$H NMR spectrum (d of 4VBC should be at 4.6 ppm) after 24 h at room temperature.

RAFT polymerization of 4-vinylbenzyl azide was conducted with cumyl dithiobenzoate (CDB) and AIBN (([4VBAz]:[CDB]:[AIBN]=600:1:0.3).

Example 6

Transformation of End Groups in a Bottle-Brush Copolymer and Incorporation of a Second Functionality The following reactions describe the experimental steps of the Staundiger process for preparing amino terminated chains (Scheme 4) exemplified by functionalizing the end groups of a bottle brush copolymer prepared by ATRP. However the same approach can be applied to any tele-functional polymers with terminal halogen groups prepared by any controlled polymerization process.

Scheme 4. Synthetic outline for the preparation of amino-terminal PS brushes.

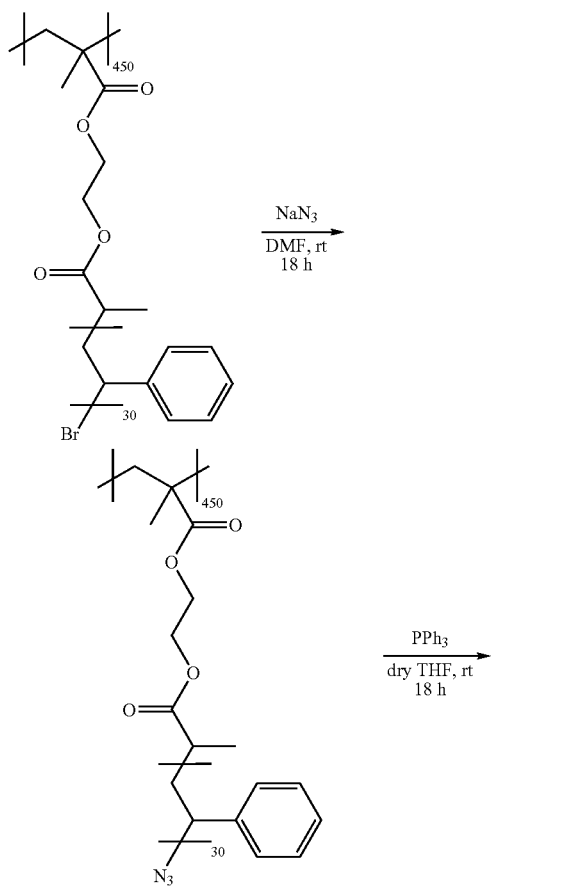

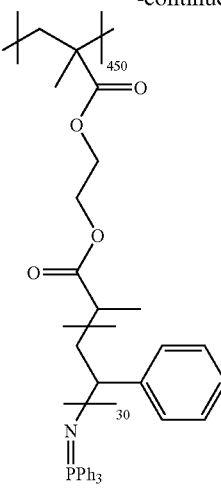

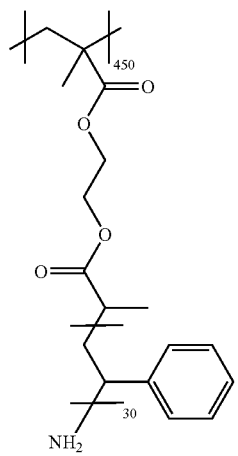

Example 6a

Azidation of P(BPEM-Graft-St) Brushes (BS-02-18)

One gram of a bottle-brush copolymer with polystyrene grafts at each monomer unit (BS-02-16-F, 0.28 mmol PS—Br endgroups) was dissolved in DMF (11.3 mL) by stirring in a 20-mL scintillation vial. NaN$_3$ (0.037 g, 0.57 mmol) was added, and the vial was sealed. The solution was allowed to stir for 24 h at room temperature. The vial was opened to air and diluted with CHCl$_3$ (10 mL). Water (20 mL) was added and the organic phase washed to remove unreacted NaN$_3$. The organic phase was isolated and washed (×2) with water (20 mL). The organic phase was dried by passing through a syringe filled with approximately 5 mL (dry volume) of MgSO$_4$ and subsequent filtering with a syringe filter. The solvent was removed by rotary evaporation and the remaining solvent was dried under vacuum overnight to yield 0.78 g (78%) of polymer (BS-02-18).

Example 6b

Hydrolysis of P(BPEM-Graft-St-N═PPh$_3$) Brushes (BS-02-21)

BS-02-20 (0.2 g, 0.050 mmol of —N═PPh$_3$ endgroups) was added to a 20-mL scintillation vial and THF (6 mL) was added followed by 0.5 mL of water (large excess with respect to endgroups) and the mixture was stirred in a sealed vial for 24 h. The vial was opened, the mixture was filtered, and the supernatant was collected. The filtered solid appeared to be a polymer where each chain of the polymer brush was amino-terminated.

Example 6c

Preparation of Iminophosphorane-Terminal Brushes from P(BPEM-Graft-St-N3) Brushes (BS-02-20)

0.5 g, of a bottle brush copolymer (BS-02-18) (0.127 mmol PS—$N_3$ endgroups) and dry THF (10 mL) were added to a 50-mL round-bottomed flask. The polymer was allowed to dissolve under constant stirring in the sealed flask. $PPh_3$ (0.1 g, 0.382 mmol) was added and the flask was resealed and covered with aluminum foil to keep solution in the dark. The solution was allowed to stir for 36 h at room temperature. After this time, the flask was opened to air and the polymer was isolated by precipitation into n-hexanes. The polymer was filtered and dried under vacuum to yield 0.35 g (70%) of polymer (BS-02-20).

Terminal functionality on a multifunctional branched or graft copolymer prepared by a controlled polymerization process may be modified to provide a different functionality than the functionality required to grow the polymer segment.

Example 7

Chain Extension and Cyclization

The applicability of the high yield chemistry discussed herein for the preparation of segmented copolymers is exemplified by the preparation of homo- and heterotelechelic polystyrene oligomers prepared by ATRP that are coupled or chain extended via a step growth "click" process to yield moderate to high molecular weight polymer containing 1,2,3-triazole linkages along the backbone. While the synthetic strategy shown below indicates the use of polystyrene, other (co)polymers could be employed and one or more different telechelic materials could be chain extended in this manner. Further the ether linkage between two propargyl functional groups can comprise other functionality, including degradable functionality.

(a)

Scheme 5. Click coupling reactions using telechelic polymers prepared by ATRP.

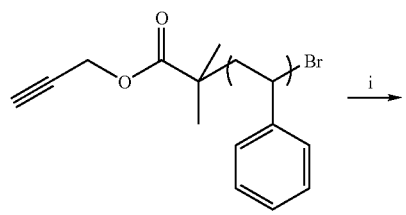

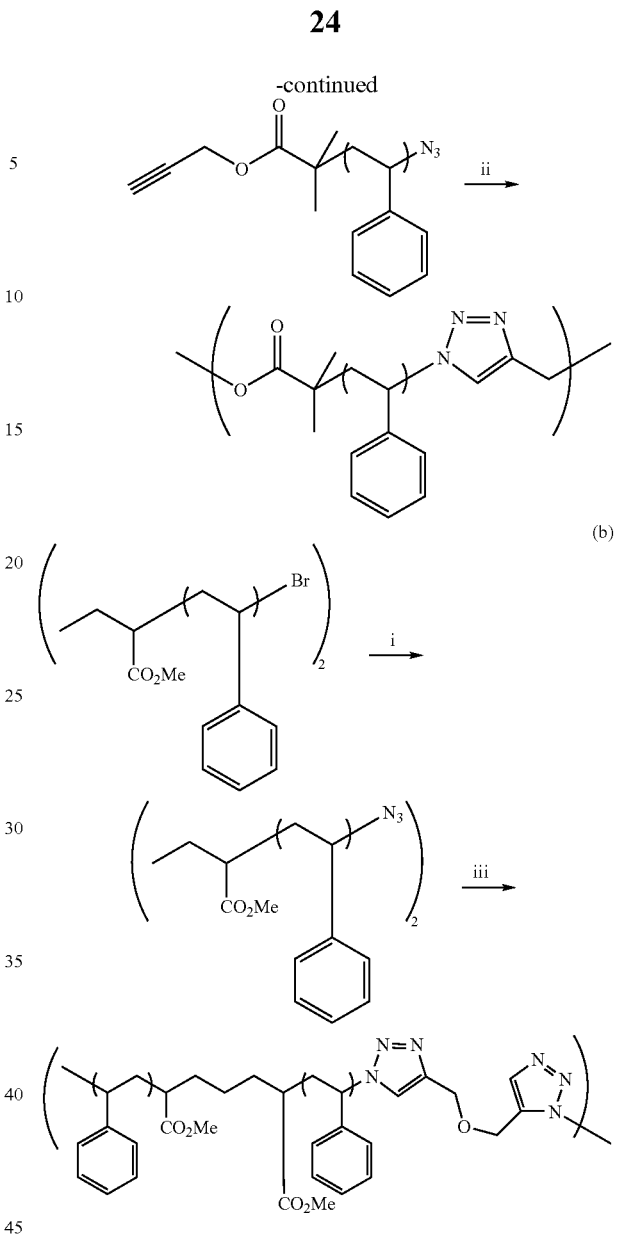

Synthesis of α-acetylene-ω-azido terminated polystyrene (7a) and its subsequent homocoupling (7b), and (7c) synthesis of diazido-terminated polystyrene and (7d) its chain extension coupling with propargyl ether.

α-Alkyne-ω-azido-terminated polySty was prepared by ATRP of Sty with propargyl 2-bromoisobutyrate as an initiator and subsequent post-polymerization nucleophilic substitution of the bromine end groups by reaction with $NaN_3$. The resulting heterotelechelic polySty was subjected to a homo-click coupling or chain extension reaction in DMF with CuBr as the catalyst. Click coupling of the telechelic polySty ($M_n$=850-2590 g/mol) resulted in the preparation of moderate to high molecular weight polymer ($M_n$ up to 61900 g/mol) with molecular weight distributions characteristic of step growth polymers ($M_w/M_n$=2-5). The final polymer would have on average 24 triazole groups distributed along the backbone. However as shown in FIG. 4 there was a fraction of the first telechelic polymer that did not participate in the chain extension reaction and apparently formed a lower molecular weight polymer. This is material that has undergone an intramolecular coupling reaction and formed a cyclic copolymer.

A one pot two step ATRP—neucleophilic substitution-click coupling process also resulted in chain extension and some cyclization.

α,ω-Diazido-terminated polySty was prepared by ATRP of styrene with dimethyl 2,6-dibromoheptadioate as an initiator followed by nucleophilic displacement of the bromine end groups with $NaN_3$. The resulting difunctional homotelechelic polymer was copolymerized with propargyl ether at room temperature to afford higher molecular weight polySty. Because the click reaction was conducted in N,N-dimethylformamide (DMF), no additional ligand was necessary to solubilize the CuBr catalyst.

Based on $^1$H NMR spectroscopy, the nucleophilic substitution was complete within several hours for all three approaches to chain extension. The amount of high-molecular weight polymer in the mixture increased, although not all of the starting material was consumed. The elution volume of the low-molecular weight fraction in the product was slightly lower than the starting heterotelechelic polystyrene, possibly indicating that cyclization occurred since the hydrodynamic volume of the cyclic product obtained by intramolecular self-coupling should be lower than the parent polymer, and thus a lower apparent SEC molecular weight is expected. The high extent of cyclization may be a result of DMF being a rather poor solvent for PSt. The fraction of azide groups in the product was small, which is expected since the concentration of end groups decreases as coupling takes place, and each click coupled chain should contain one azide and one alkyne end group.

A chain extension intramolecular coupling chemistry resulting in polymer cyclization can be converted into a high yield intramolecular click coupling reaction yielding cyclic structures by appropriate selection of the solvent. The propensity for intramolecular reaction is increased for a collapsed polymer coil. A poor solvent for the telechelic oligo/polymer results in the formation of a "collapsed" molecular chain that preferentially undergoes intramolecular reaction as evidenced by an apparent decrease in the oligomer molecular weight measured by size exclusion chromatography. The solvating power of a given solvent can be modified by addition of a non-solvent to bring about this change in the intra-molecular topology of the polymer in a given solvent and thereby increase the yield of the intramolecular coupling reaction.

Example 7a

Synthesis of propargyl 2-bromoisobutyrate

Propargyl alcohol (12.8 mL, 0.218 mol) and 2-bromoisobutyric acid (36.4 g, 0.218 mol) were dissolved in methylene chloride (150 mL). The reaction mixture was cooled in an ice-water bath and a solution of dicyclohexyl carbodiimide (45.0 g, 0.22 mol) in methylene chloride (50 mL) was slowly added while stirring. A solution of 4-dimethylaminopyridine (1.5 g) in methylene chloride (50 mL) was then added over a period of 10 min. The mixture was stirred in the cooling bath for 1 h and then at room temperature for 24 h. The precipitated dicyclohexylurea was filtered and washed on the filter with methylene chloride (50 mL). The solvent was removed on a rotary evaporator and the product was distilled under vacuum. Yield: 33.0 g (0.161 mol, 74%). $^1$H NMR spectrum in $CDCl_3$ (δ, ppm): 4.77 (d, 2H, $CH_2O$), 2.51 (t, 1H, C≡CH), and 1.96 (s, 6H, $(CH_3)_2C$). IR spectrum (neat liquid, NaCl plates): 3296 cm$^{-1}$ ($v_{≡C-H}$), 2131 cm$^{-1}$ ($v_{C≡C}$), and 1741 cm$^{-1}$ ($v_{C=O}$).

Example 7b

Synthesis of α-alkyne-ω-bromo Terminated Polystyrene; In-Situ Azidation and Click Coupling A mixture of Sty (20 mL, 0.175 mol) and toluene (13.3 mL) was degassed in a Schlenk flask by 5 freeze-pump-thaw cycles. CuBr (0.0834 g, 0.58 mmol) was then added to the frozen mixture under nitrogen flow and the flask was closed, evacuated and back-filled with nitrogen. The vacuum-nitrogen cycle was repeated two more times, and the mixture was allowed to melt. PMDETA (122 μL, 0.58 mmol) was injected, and after formation of clear yellowish solution, the reaction mixture was heated to 80° C. in an oil bath. The initiator PgBiB (0.34 mL, 2.326 mmol) was injected and the reaction mixture was stirred at 80° C. for 200 min. The monomer conversion reached 13%. Half of the reaction mixture was taken with a nitrogen purged syringe. The sample was diluted with THF and the solution was passed through a column containing neutral alumina in order to remove the catalyst. The absorbent in the column washed with THF (30-40 mL) and the polymer was isolated by vacuum evaporation of the liquids. $M_n$=850 g/mol, $M_w/M_n$=1.03. The portion of the reaction mixture that remained in the Schlenk flask was frozen by immersion in liquid nitrogen. The flask was opened and sodium azide (0.76 g, 11.7 mmol) and ascorbic acid, (to reduce the $Cu^{II}$ complexes formed during the polymerization), (0.1 g, 0.57 mmol) were added under nitrogen flow. The flask was closed, evacuated, and back-filled with nitrogen. The mixture was thawed by immersion of the flask in hot water, and deoxygenated DMF (10 mL) was injected. The resulting heterogeneous mixture changed color from dark green to bright greenish-yellow in several hours. Samples were withdrawn periodically with a nitrogen-purged syringe and analyzed by size exclusion chromatography (SEC). The presence of Sty and toluene did not adversely affect the click coupling, which was rather efficient, as judged by SEC analysis.

Example 7c

Preparation of α-alkyne-ω-azido Terminated Polystyrene and its Copper(I) Bromide-Catalyzed Click Coupling A mixture of Sty (10 mL, 87 mmol), CuBr (0.32 g, 2.2 mmol), propargyl 2-bromoisobutyrate (PgBiB) (0.32 mL, 2.2 mmol), and diphenyl ether (1.1 mL) in a 25 mL Schlenk flask was subjected to three freeze-pump-thaw cycles. The flask was placed in an oil bath preheated to 90° C., and PMDETA (0.46 mL, 2.2 mmol) was injected via nitrogen-purged syringe. After 75 min, the flask was removed from the heat, opened, diluted with THF, and passed through a neutral alumina column to remove the catalyst. The absorbent in the column washed with THF (30-40 mL) and the resulting polymer solution was concentrated by rotary evaporation. The polymer was precipitated in methanol and dried under vacuum ($M_n$=2590 g/mol, $M_w/M_n$=1.12). A fraction of the resulting polySty (2.0 g, 0.77 mmol) and $NaN_3$ (78 mg, 1.2 mmol) were dissolved in DMF (12 mL) in a sealed 50 mL round-bottomed flask. The mixture was allowed to stir at room temperature for 4 h, and the resulting polymer was isolated by precipitation into methanol and drying under vacuum. NMR spectroscopy indicated the conversion of α,ω- dibromo- to α,ω-diazidopolystyrene was complete. A portion of the resulting polystyrene (0.5 g, 0.19 mmol azide end groups) and CuBr (15 mg, 0.10 mmol) were added to a Schlenk flask, and the vessel was subjected to three vacuum-nitrogen cycles. Nitrogen-purged DMF (4 mL) was added, and the mixture was allowed to stir at room temperature while samples were withdrawn periodically via syringe to follow the increase in molecular weight.

Example 7d

Synthesis of α,ω-diazido Terminated Polystyrene

A mixture of Sty (30 mL, 0.26 mol) and toluene (20 mL) was degassed in a Schlenk flask by 5 freeze-pump-thaw cycles. The ATRP catalyst was added as described above and consisted of CuBr (0.25 g, 1.7 mmol) and PMDETA (0.36 mL, 1.74 mmol). The difunctional initiator, dimethyl 2,6-dibromoheptadioate DM-2,6-DBHD, (0.75 mL, 3.45 mmol) was added last, and the reaction was stirred at 80° C. for 140 min. The monomer conversion reached 30%. The reaction mixture was diluted with THF, and the solution was passed through a column containing neutral alumina to remove the catalyst. The absorbent in the column washed with THF (30-40 mL), and the resulting polymer solution was concentrated by rotary evaporation. The polymer was precipitated in hexane and dried under vacuum ($M_n$=1900 g/mol, $M_w/M_n$=1.09). Part of the product (1.9 g, 1.0 mmol, corresponding to 2 mmol of bromine end-groups) was dissolved in DMF (10 mL) and sodium azide (0.26 g, 40 mmol) was added. The mixture was stirred for 4 h at room temperature and the polymer was precipitated in methanol and dried under vacuum. NMR spectroscopy indicated the conversion of α,ω-dibromo- to α,ω-diazidopolystyrene was complete. The polymer was analyzed by SEC: $M_n$=2000 g/mol, $M_w/M_n$=1.08.

Example 7e

Click Coupling of α,ω-diazido Terminated Polystyrene with Propargyl Ether

A mixture of 0.50 g of α,ω-diazido polystyrene of $M_n$=2000 g/mol (0.25 mmol, corresponding to 0.50 mmol of azide groups) and 0.036 g (0.25 mmol) CuBr was placed in a flask with a stir bar. The flask was then closed with a rubber septum, evacuated and back-filled with nitrogen three times. DMF (3 mL, deoxygenated by bubbling with nitrogen) was injected, and the mixture was stirred until the polymer dissolved. Deoxygenated propargyl ether (25.7 μL, 0.25 mmol, corresponding to 0.50 mmol of alkyne groups) was then added. The reaction mixture became increasingly turbid and bright yellow in color. It was stirred at room temperature while samples were periodically withdrawn via nitrogen-purged syringe.

While propargyl ether was employed, other linking groups between the two acetylene groups could be employed to further introduce functionality into the copolymer. Of particular utility would be functional groups that introduced a degradable linkage to the material.

Further evidence of cyclization was evidenced by the limited monomer conversion achieved at even long reaction times (A, Table 1). After 14.5 h the monomer conversion was 82% and increased to only 83% at 89 h. Meanwhile, the coupling products continuously increased in molecular weight, indicating that the conditions were still appropriate for the reaction to take place. The reaction was stopped and the polymer was analyzed by $^1$H NMR spectroscopy (FIG. 4).

The fraction of residual azide groups in the product was small, which is expected since the concentration of end groups decreases as coupling takes place, and each click coupled chain should contain one azide and one alkyne end group. As evidenced by SEC, a small portion of higher molecular weight chains were present in the starting material due to radical-radical termination during ATRP. These chains contain two alkyne end groups and potentially limit the degree of polymerization of the click coupled chains.

TABLE 1

Data from the Click Coupling of Hetero- and Homotelechelic Polystyrene

| Polymerization | Time (h) | Monomer Conv.[d] | $M_n$[e] | $M_w/M_n$[e] | $M_{n, app}$ Monomer[f] | $M_w/M_n$ Monomer[f] |
|---|---|---|---|---|---|---|
| A[a] | 0 | 0 | — | — | 2 590 | 1.11 |
|  | 14.5 | 0.82 | 15 500 | 2.43 | 1 920 | 1.04 |
|  | 21.5 | 0.82 | 15 600 | 2.35 | 1 900 | 1.04 |
|  | 89 | 0.83 | 21 500 | 4.85 | 1 920 | 1.04 |
| C[c] | 0 | 0 | — | — | 2 020 | 1.09 |
|  | 16.5 | 0.93 | 13 700 | 2.77 | 1 570 | 1.03 |
|  | 24 | 0.93 | 14 800 | 3.15 | 1 540 | 1.03 |
|  | 40 | 0.93 | 16 700 | 3.34 | 1 550 | 1.03 |

[a]Click coupling of α-alkyne-ω-azido-terminated polystyrene.
[b]One-pot ATRP-nucleophilic substitution-click coupling of α-alkyne-ω-azido-terminated polystyrene.
[c]Click coupling of α,ω-diazido-terminated polystyrene with propargyl ether.
[d]Monomer conversion determined by SEC.
[e]Number average molecular weight and polydispersity of the click coupled polymer as determined by SEC (PSty calibration) after deconvolution of the polymer and monomer peaks.
[f]Number average molecular weight and polydispersity of the difunctional PSty monomer as determined by SEC (PSty calibration) after deconvolution of the polymer and monomer peaks.

Example 7f

Preparation of a Chain Extended or Bottle Brush Block Copolymer by Click Coupling from an Azido Chain End The polymethylmethacrylate prepared in example 5d was coupled to a diazido-polystyrene prepared in example 7d. The reaction was conducted at a 1:1 ratio of functional groups in dimethyl formamide solution at room temperature using copper bromide as catalyst with no additional ligand. A block copolymer was formed.

7g

Preparation of a Chain Extended Tethered Nanocomposite

The terminal chain ends of a silica particle tethered poly (butyl acrylate) nanocomposite, prepared as disclosed in U.S. Pat. No. 6,627,314, were transformed into azido groups as disclosed in example 7c and then the tethered chains of the composite were chain extended by coupling with acetylene terminated poly(methyl methacrylate). The size of the composite structure increased as viewed by AFM images of the tethered block copolymer indicating successful formation of attached block copolymer chains. Chain extension was confirmed by GPC on the cleaved chains.

Embodiments of the present invention include selecting high yield post-polymerization functionalization chemistry from high yield chemistries to functionalize the first attached functional group in a copolymer prepared by a controlled polymerization process by initially selecting the functional groups on each monomer or at each chain end to undergo reactions only with the functional groups on the added reagent. Further the added agent can comprise a third functionality which is thereby attached to the first polymer. The third functionality can comprise oligo/polymeric segments prepared by similar or different polymerization processes and can include inorganic materials or organic materials including bio-active or bio-responsive materials. Further the linking chemistry can be utilized to form graft copolymers, block copolymers, branched copolymers and linear copolymers with designed distribution of polymer segments or materials attached to a spectrum of substrate.

There have been several review articles where click chemistry is discussed including:

Hawker, C. J.; Wooley, K. L. *Advances in Dendritic Macromolecules* 1995, 2, 1-39;

Matthews, O. A.; Shipway, A. N.; Stoddart, J. F. *Progress in Polymer Science* 1998, 23, 1-56;

Majoral, J.-P.; Caminade, A.-M. *Chemical Reviews* (Washington, D.C.) 1999, 99, 845-880;

Grayson, S. M.; Frechet, J. M. J. *Chemical Reviews* (Washington, D.C.) 2001, 101, 3819-3867.

Other high yield clean chemistry approaches have been described:

Maraval, V.; Pyzowski, J.; Caminade, A.-M.; Majoral, J.-P. *Journal of Organic Chemistry* 2003, 68, 6043-6046. describe a green chemistry method for dendrimer synthesis using phosphaze hydrazine with only N2 or H2O as byproducts.

Ihre, H.; Padilla de Jesus, O. L.; Frechet, J. M. J. *Journal of the American Chemical Society* 2001, 123, 5908-5917 describe fast and convenient divergent synthesis of aliphatic ester dendrimers by anhydride coupling.

Carnahan, M. A.; Grinstaff, M. W. "Synthesis and Characterization of Poly(glycerol-succinic acid) Dendrimers;" *Macromolecules* 2001, 34, 7648-7655.

Wu, P.; Feldman, A. K.; Nugent, A. K.; Hawker, C. J.; Scheel, A.; Voit, B.; Pyun, J.; Frechet, J. M. J.; Sharpless, K. B.; Fokin, V. V. "Efficiency and fidelity in a click-chemistry route to triazole dendrimers by the copper(I)-catalyzed ligation of azides and alkynes;" *Angewandte Chemie, International Edition* 2004, 43, 3928-3932.

Helms, B. et. al. *Journal of the American Chemical Society* 2004, 126, 15020-15021, "Dendronized Linear Polymers via \"Click Chemistry\."

Collman, J. P.; Devaraj, N. K.; Chidsey, C. E. D. "Huisgen 1,3-dipolar cycloadditions;" *Langmuir* 2004, 20, 1051-1053.

The invention claimed is:

1. A polymer, comprising:
    5-vinyltetrazole monomer units; and
    a molecular weight distribution less than 2.0.

2. The polymer of claim 1, wherein the polymer is a block copolymer and the polymer comprises a block of 5-vinyltetrazole monomer units.

3. The polymer of claim 2, further comprising a block capable of selective separation of closely related chemical species such as ions, proteins or nucleic acids via ionic bonding or complex formation.

4. The polymer of claim 3, wherein the block capable of selective separation comprises at least one of dimethylacrylamide, butyl acrylate, dimethylaminoethyl methacrylate, diethyl acrylamide, and NIPAM.

5. The polymer of claim 4, wherein the polymer is used as a coating.

6. The polymer of claim 5, wherein the polymer phase separates into discrete nano-domains.

7. The polymer of claim 6, wherein the polymer a phase of the nano-domains comprises at least a portion of the 5-vinyltetrazole monomer units, and the 5-vinyltetrazole monomer units form complexes with a transition metal.

8. The polymer of claim 1, comprising at least two blocks comprising 5-vinyltetrazole monomer units.

9. The polymer of claim 1, wherein the polymer is at least one of a homopolymer, a random or statistical copolymer, a star block copolymer, a linear polymer, a branched polymer, a hyperbranched polymer, a dendritic polymer, a bottle-brush copolymer and a crosslinked structure.

10. The polymer of claim 1, wherein the polymer is tethered to a surface.

11. The polymer of claim 1, wherein the polymer is supported on a surface.

12. The polymer of claim 11 wherein partial coverage of the surface provides an array of functional segments.

13. The polymer of claim 11, wherein the polymer is support on one of an inorganic support and an organic support.

14. The polymer of claim 13, wherein the support is at least one of an ion exchange resin, a silica particle, and a poly (styrene) particle.

15. The polymer of claim 2, wherein the polymer is one of a star block copolymer, a linear polymer, a branched polymer, a hyperbranched polymer, a dendritic polymer, a bottle-brush copolymer and a crosslinked structure.

16. The polymer of claim 13, wherein at least a portion of the monomers are radically copolymerizable monomers.

17. The copolymer of claim 3, wherein at least a portion of the monomers are radically copolymerizable monomers.

18. A process, comprising:
    reacting a first polymer comprising at least one nitrile group with an azide to form a polymer comprising at least one tetrazole ring, wherein the first polymer has molecular weight distribution of less than 2.0.

19. The process of claim 18, wherein first polymer is at least on of a homopolymer, a copolymer, a random copolymer, statistical copolymer, linear block copolymer, star block copolymer, a graft copolymer, a brush copolymer, and a polymer attached to a particle surface.

20. The process of claim 18, wherein reacting a first polymer comprising at least one nitrile group with an azide comprises reacting the first polymer with sodium azide and zinc chloride and wherein the molar ratio of sodium azide to nitrile groups and the molar ratio of zinc chloride to nitrile groups are both individually greater than 1.5.

\* \* \* \* \*

UNITED STATES PATENT AND TRADEMARK OFFICE
CERTIFICATE OF CORRECTION

PATENT NO.        : 7,795,355 B2
APPLICATION NO.   : 10/591425
DATED             : September 14, 2010
INVENTOR(S)       : Matyjaszewski et al.

It is certified that error appears in the above-identified patent and that said Letters Patent is hereby corrected as shown below:

Title page, item 75, "Inventors" delete "Krzyszlof" and replace therewith --Krzysztof--.

In the Abstract, second line from the end, delete "mock" and replace therewith --block--.

Column 3, line 10, delete "6,759,49 and 6,790,9191" and replace therewith --6,759,491 and 6,790,919--.

Column 6, line 51, delete the word "a" occurring after the word "by".

Column 7, line 38, insert the word --groups-- after the word "functional".

Column 8, line 39, delete the word "a" occurring after the word "by".

Column 8, line 53, delete the word "by" and replace therewith --be--.

Column 10, line 19, delete the word "comprises" and replace therewith --comprising--.

Column 10, line 29, delete the second occurrence of the phrase "tetrazole functionality".

Column 13, line 52, add a (.) after the word "group".

Column 14, line 40, delete the word "nitrites" and replace therewith --nitriles--.

Column 14, line 52, add a (.) after the word "work".

Column 15, line 5, insert the word --was-- between the words "polymer" and "washed".

Column 15, line 57, in the heading for Table 1, delete the word "styene-b-acrylonitrile" and replace therewith --styrene-b-acrylonitrile--.

Column 26, line 24, insert the word --was-- between the words "column" and "washed".

Signed and Sealed this

Twenty-third Day of November, 2010

David J. Kappos
*Director of the United States Patent and Trademark Office*

CERTIFICATE OF CORRECTION (continued)
U.S. Pat. No. 7,795,355 B2

Column 26, line 58, insert the word --was-- between the words "column" and "washed".

Column 30, line 9, in Claim 7 delete the word "a" between "polymer" and "phase".

Column 30, line 46, in Claim 19 delete the word "on" and replace therewith --one--.